US012585045B2

(12) United States Patent
Nishimoto et al.

(10) Patent No.: US 12,585,045 B2
(45) Date of Patent: Mar. 24, 2026

(54) OPTICAL THIN FILM MANUFACTURING METHOD AND OPTICAL THIN FILM

(71) Applicant: TOKAI OPTICAL CO. LTD.,
Okazaki (JP)

(72) Inventors: Keiji Nishimoto, Okazaki (JP); Chiaki Inoue, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 322 days.

(21) Appl. No.: 18/326,094

(22) Filed: May 31, 2023

(65) Prior Publication Data

US 2023/0305191 A1     Sep. 28, 2023

Related U.S. Application Data

(63) Continuation of application No. PCT/JP2021/042278, filed on Nov. 17, 2021.

(30) Foreign Application Priority Data

Dec. 2, 2020     (JP) ................................. 2020-200494

(51) Int. Cl.
*G02B 1/11*            (2015.01)
(52) U.S. Cl.
CPC ..................................... *G02B 1/11* (2013.01)
(58) Field of Classification Search
None
See application file for complete search history.

(56) References Cited

U.S. PATENT DOCUMENTS

2012/0050871 A1     3/2012   Sakai et al.
2013/0016430 A1*   1/2013   Ogawa ..................... G02B 1/11
                                                                        252/582

(Continued)

FOREIGN PATENT DOCUMENTS

JP          2010-054827 A      3/2010
JP          2012-073590 A      4/2012

(Continued)

OTHER PUBLICATIONS

International Search Report and Written Opinion (with English translation) dated Jan. 11, 2022 (Application No. PCT/JP2021/042278).

(Continued)

*Primary Examiner* — Jyotsna V Dabbi
(74) *Attorney, Agent, or Firm* — BURR PATENT LAW, PLLC

(57)            ABSTRACT
A method for manufacturing an optical thin film having a first thin film portion and a second thin film portion, on a film formation surface of a base member directly or via an intermediate film. The method comprising forming the first thin film portion on a first film formation portion of the film formation surface; forming a washing-time removal film on the first thin film portion, the washing-time removal film having at least one of a fluff-like structure, a pyramid group-like structure and a pinholder-like structure, and being at least one of aluminum and an aluminum compound; forming the second thin film portion on a second film formation portion of the film formation surface, and on the first film formation portion on which the first thin film portion and the washing-time removal film have been formed; and removing the washing-time removal film and the second thin film portion by washing.

8 Claims, 23 Drawing Sheets

(56)                    References Cited

U.S. PATENT DOCUMENTS

| 2014/0268344 | A1* | 9/2014 | Arakawa .............. G02B 26/001 |
| | | | 359/580 |
| 2015/0378058 | A1 | 12/2015 | Sonoda et al. |
| 2017/0219819 | A1 | 8/2017 | Sonoda et al. |
| 2021/0149157 | A1* | 5/2021 | Kim ....................... H04N 23/57 |

FOREIGN PATENT DOCUMENTS

| JP | 2014-178502 | A | 9/2014 | |
| JP | 2016-033632 | A | 3/2016 | |
| JP | 2017-107011 | A | 6/2017 | |
| JP | 2020-140130 | A | 9/2020 | |
| WO | WO-2013018743 | A1 * | 2/2013 | ......... H10F 39/8053 |
| WO | 2016/060003 | A1 | 4/2016 | |

OTHER PUBLICATIONS

Japanese Office Action (with English translation) dated Nov. 18, 2025 (Application No. 2022-566830).

* cited by examiner

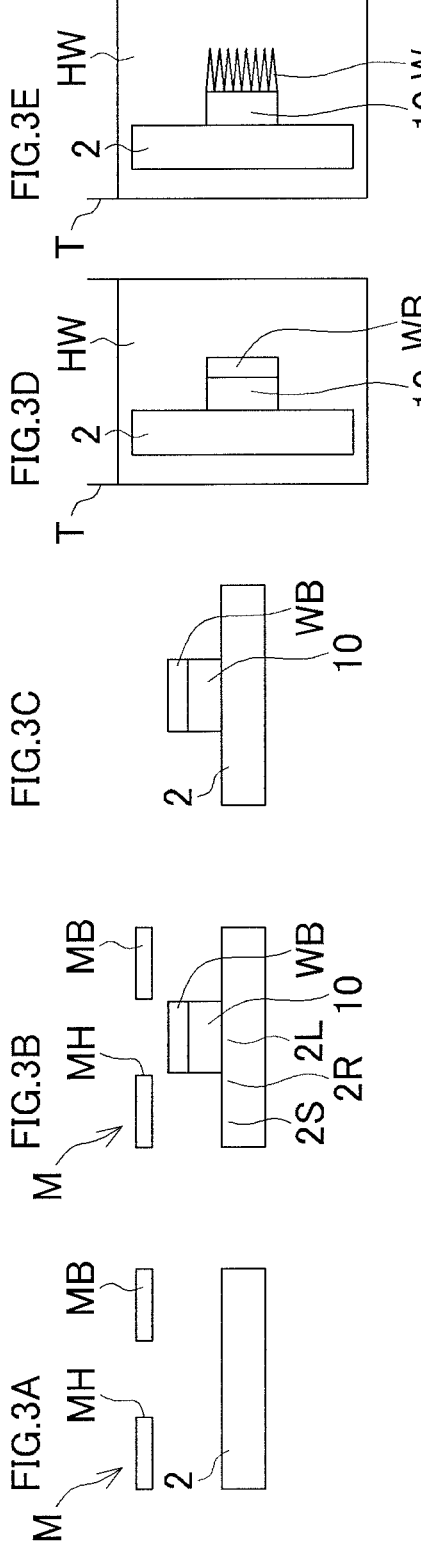

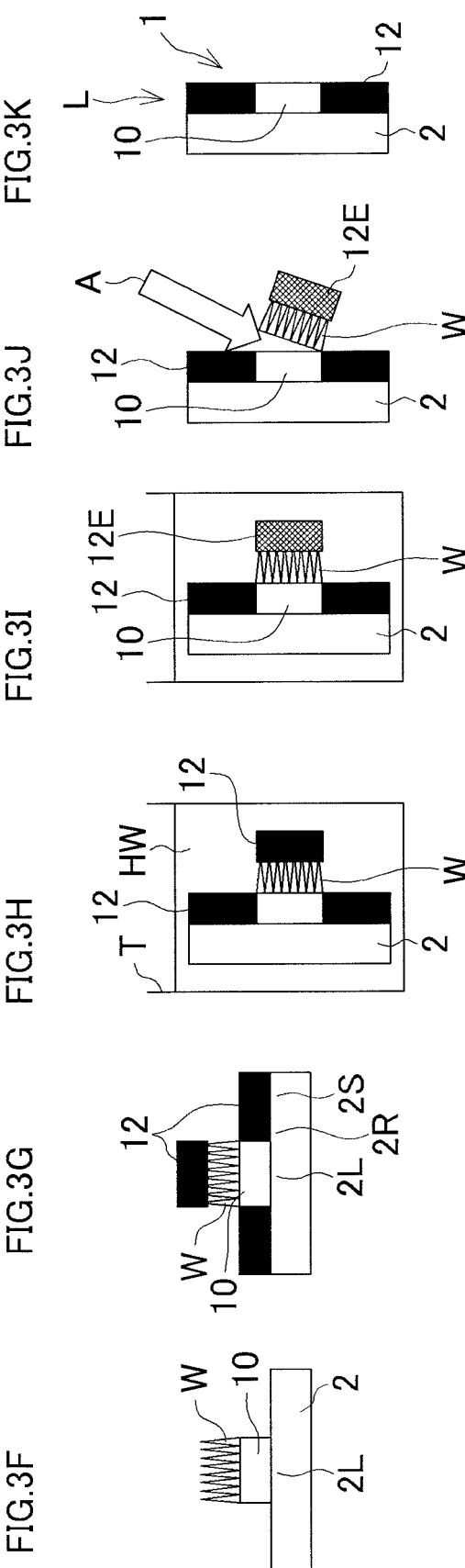

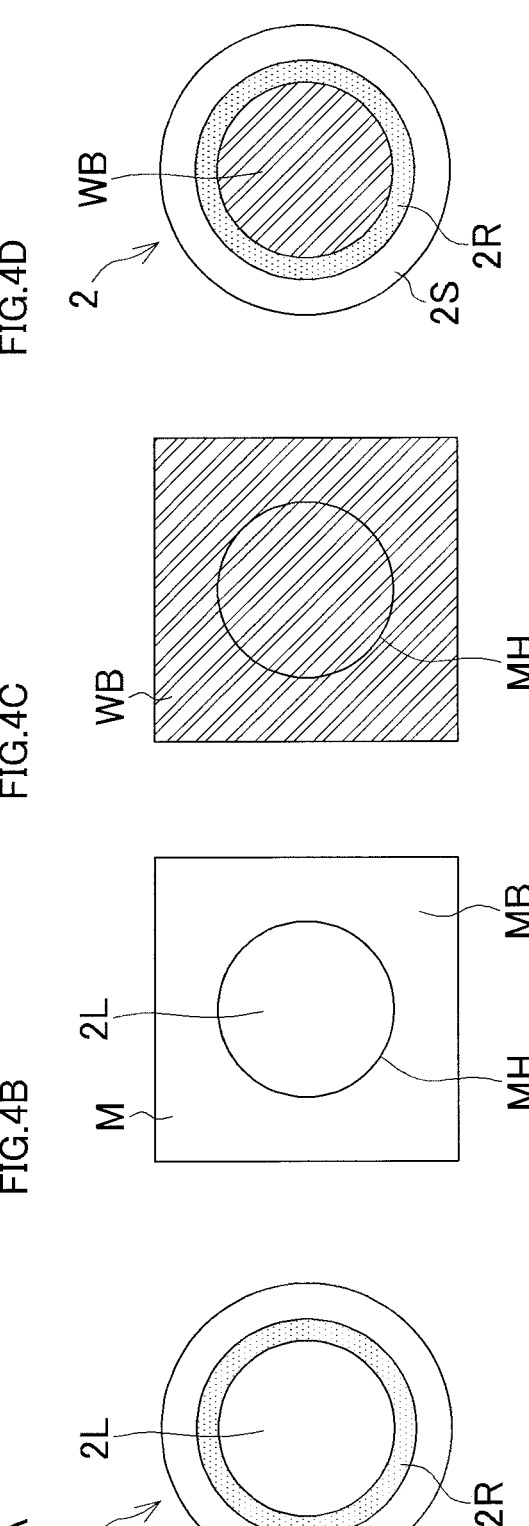

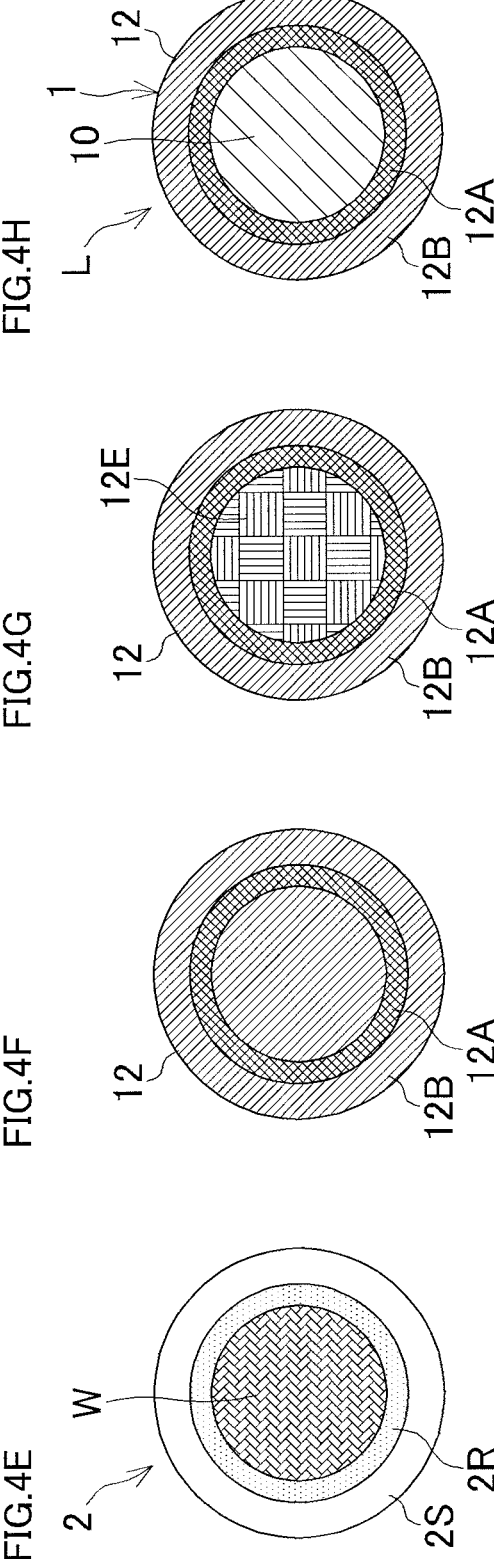

to FIG.3D

OPTICAL THIN FILM MANUFACTURING METHOD AND OPTICAL THIN FILM

CROSS REFERENCE TO RELATED APPLICATION

This application is a Continuation of International Application No. PCT/JP2021/042278, filed on Nov. 17, 2021, which claims the benefit of Japanese Patent Application Number 2020-200494 filed on Dec. 2, 2020, the disclosures of which are incorporated by reference herein in their entireties.

FIELD OF THE INVENTION

The present invention relates to an optical thin film to be formed on a surface of a base member or the like and a method for manufacturing the optical thin film.

BACKGROUND OF THE INVENTION

Camera modules included in mobile terminals such as smartphones and electronic devices such as digital cameras, each include an imaging element for imaging a subject and a lens unit for forming an image of the subject on the imaging element.

In particular, a small-sized lens unit may include a light shielding member for forming an annular light shielding portion. The light shielding member allows light to enter the lens unit on the inner side of the light shielding portion (a transmission portion) and cuts a part or the entirety of the light at the light shielding portion surrounding the transmission portion, thereby limiting the incident range of incident light into the lens unit, suppressing generation of stray light in the lens unit, and preventing occurrence of halation, lens flare, ghosting, for example, and contributing to improvement of image quality.

As such a light shielding member, JP 2020-140130 A discloses a thin metal plate having a through hole formed at the center thereof. The thin metal plate is manufactured by forming a resist pattern on a metal base member and performing etching using the resist pattern as a mask.

Since the light shielding member of JP 2020-140130 A is made of a thin metal plate, the through hole needs to be used as a transmission portion. The formation of the through hole requires a resist pattern step and an etching step, which increases the manufacturing cost. In addition, at the transmission portion of the light shielding member of Patent Literature 1, an optical thin film or the like cannot be placed as it is. In order to place the optical thin film or the like at the transmission portion, another member in which the optical thin film is formed on a base member different from the light shielding portion is adhered inside the through hole of the light shielding member of JP 2020-140130 A. In this case, the configuration becomes complicated, resulting in, for example, an increase in the costs of manufacturing.

Therefore, a main object of the present invention is to provide an optical thin film manufacturing method capable of inexpensively manufacturing an optical thin film in which a first thin film portion and a second thin film portion are separated.

Also, another main object of the present invention is to provide an optical thin film in which a first thin film portion at a transmission portion or the like and a second thin film portion at a light shielding portion or the like are formed so as to be separated in a simple configuration.

SUMMARY OF THE INVENTION

The invention according to a first aspect is a method for manufacturing an optical thin film having a first thin film portion and a second thin film portion having a film configuration different from that of the first thin film portion, on a film formation surface of a base member directly or via an intermediate film, the method including: forming the first thin film portion on a first film formation portion of the film formation surface; forming a washing-time removal film on the first thin film portion, the washing-time removal film having at least one of a fluff-like structure, a pyramid group-like structure and a pinholder-like structure, and being at least one of aluminum and an aluminum compound; forming the second thin film portion on a second film formation portion, that is different from the first film formation portion of the film formation surface, and on the first film formation portion on which the first thin film portion and the washing-time removal film have been formed; and; and removing the washing-time removal film and the second thin film portion thereon by washing.

In the invention according to a second aspect based on the above invention, the second thin film portion has a ring shape or a frame shape.

In the invention according to a third aspect based on the above invention, the washing-time removal film is formed by immersing a washing-time removal base film in hot water, the washing-time removal base film being formed by physical vapor deposition using at least one of aluminum and an aluminum compound as a material.

In the invention according to a fourth aspect based on the above invention, the washing-time removal film and the second thin film portion thereon are washed by at least one of running water and ultrasonic waves.

In the invention according to a fifth aspect based on the above invention, the second thin film portion is a light shielding film that cuts visible light.

In the invention according to a sixth aspect based on the above invention, the first thin film portion is an anti-reflection film that suppresses reflection of visible light.

In the invention according to a seventh aspect based on the above invention, in forming the first thin film portion, the first thin film portion is formed only on the first film formation portion by a mask.

In the invention according to an eighth aspect based on the above invention, in forming the first thin film portion, the first thin film portion is formed on an entirety or a part of the intermediate film or the film formation surface whose part is the first film formation portion, and then the first thin film portion on the part of the intermediate film or the film formation surface other than the first film formation portion is removed by a laser beam.

An invention according to a ninth aspect is an optical thin film including a first thin film portion and a second thin film portion having a film configuration different from that of the first thin film portion, wherein the second thin film portion surrounds the first thin film portion, and no resist remains at the first thin film portion.

In the invention according to a tenth aspect based on the above invention, the second thin film portion is a light shielding film that cuts visible light.

In the invention according to an eleventh aspect based on the above invention, the first thin film portion is an anti-reflection film that suppresses reflection of visible light.

A main effect of the present invention is to provide an optical thin film manufacturing method capable of inexpensively manufacturing an optical thin film in which a first thin film portion and a second thin film portion are separated.

Also, another main effect of the present invention is to provide an optical thin film in which a first thin film portion at a transmission portion or the like and a second thin film portion at a light shielding portion or the like are formed so as to be separated in a simple configuration.

BRIEF DESCRIPTION OF THE DRAWINGS

FIGS. 3A to K are schematic diagrams illustrating a manufacturing method of Example 1 corresponding to the first embodiment of the present invention, mainly from a side surface side of the light shielding AR lens member.

FIGS. 4A to H are schematic diagrams illustrating the manufacturing method of Example 1 mainly from the back side of the light shielding AR lens member.

4

Figure 17:
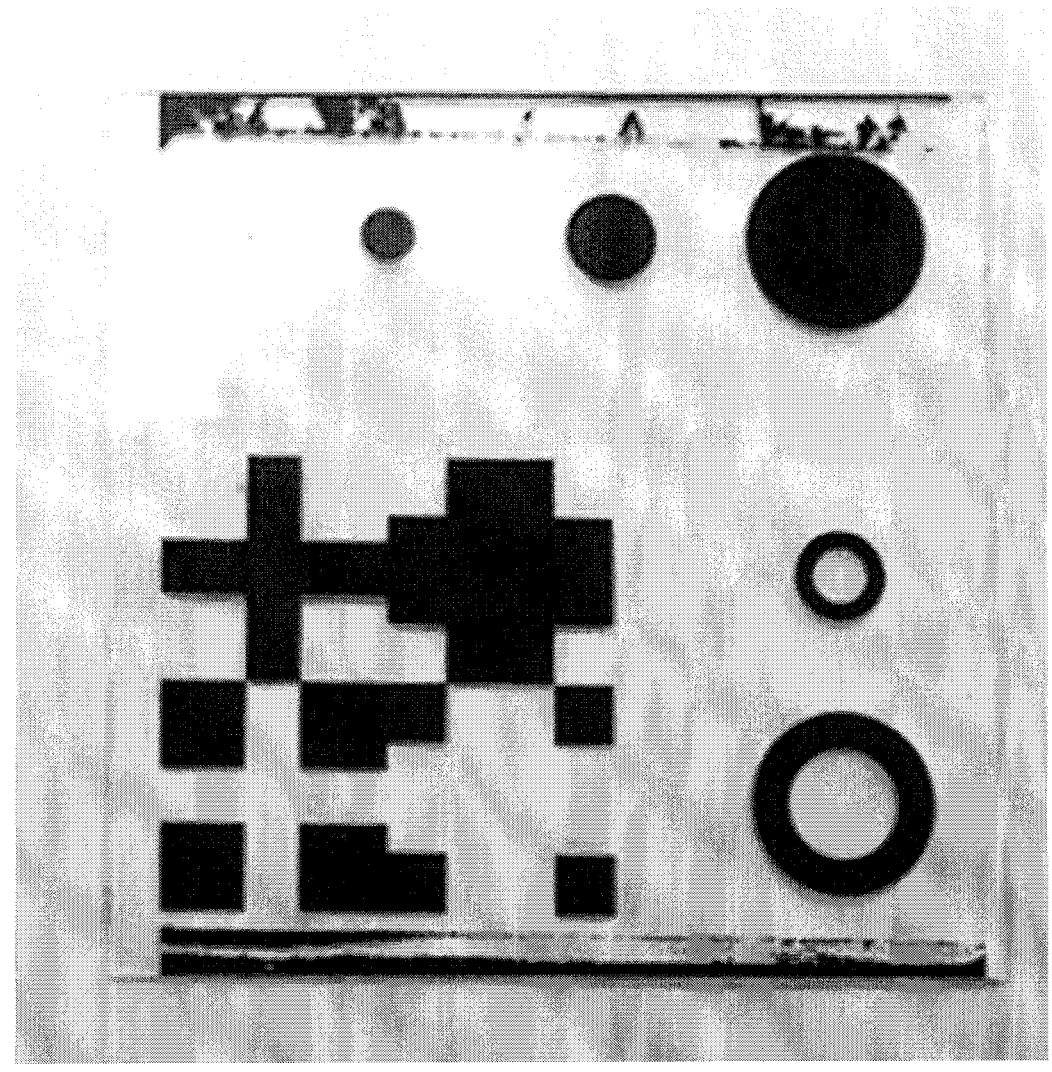
FIG. 17 is a photograph showing a sample manufactured by the same manufacturing method as in Example 3.
Figure 19:
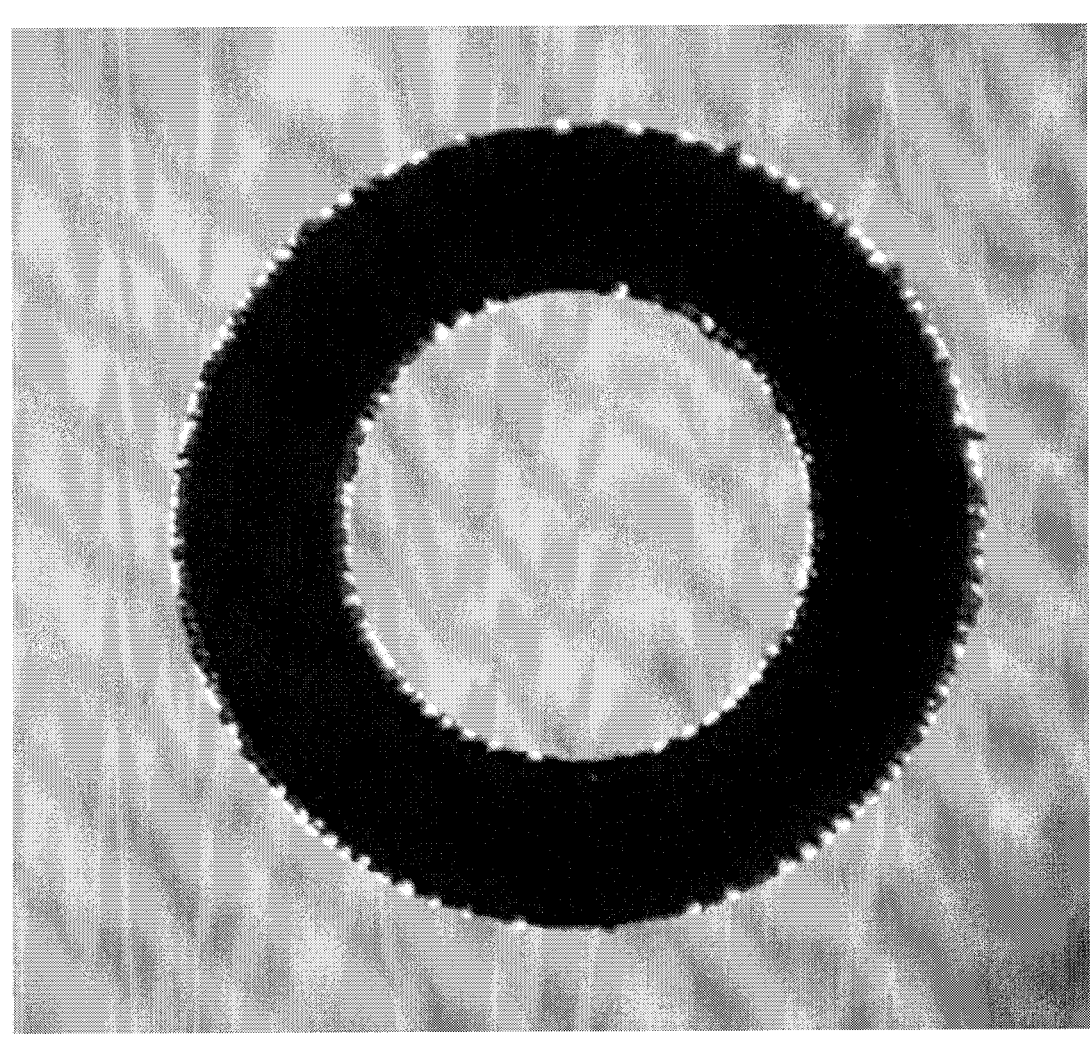

FIG. 19 is an enlarged view of a small black ring-shaped portion in FIG. 17.

Figure 20:
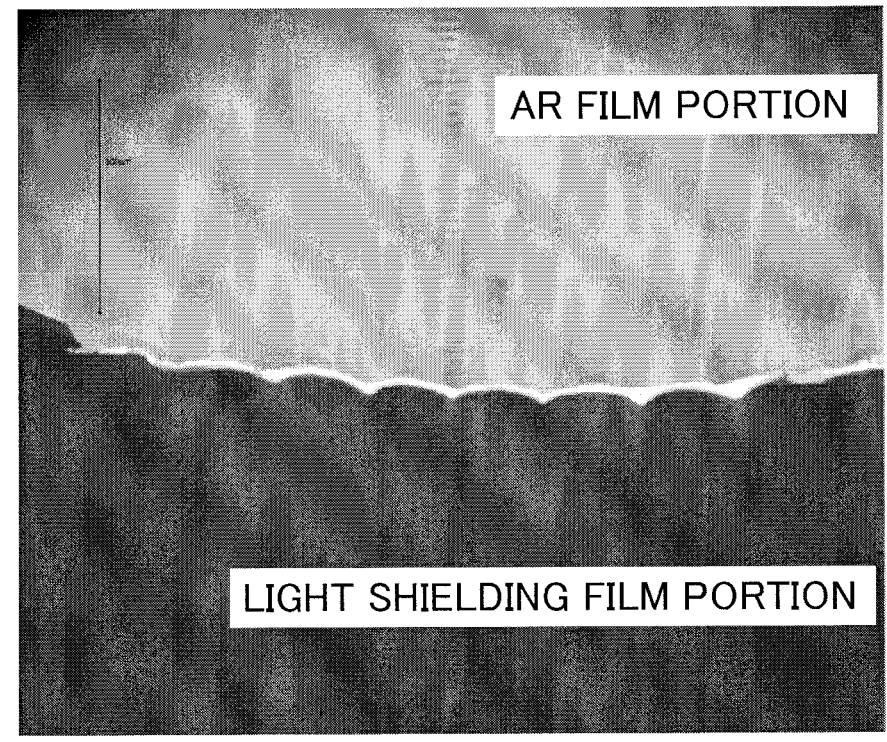

FIG. 20 is an enlarged view of a ring lower inner peripheral portion in FIG. 19.

Figure 21:
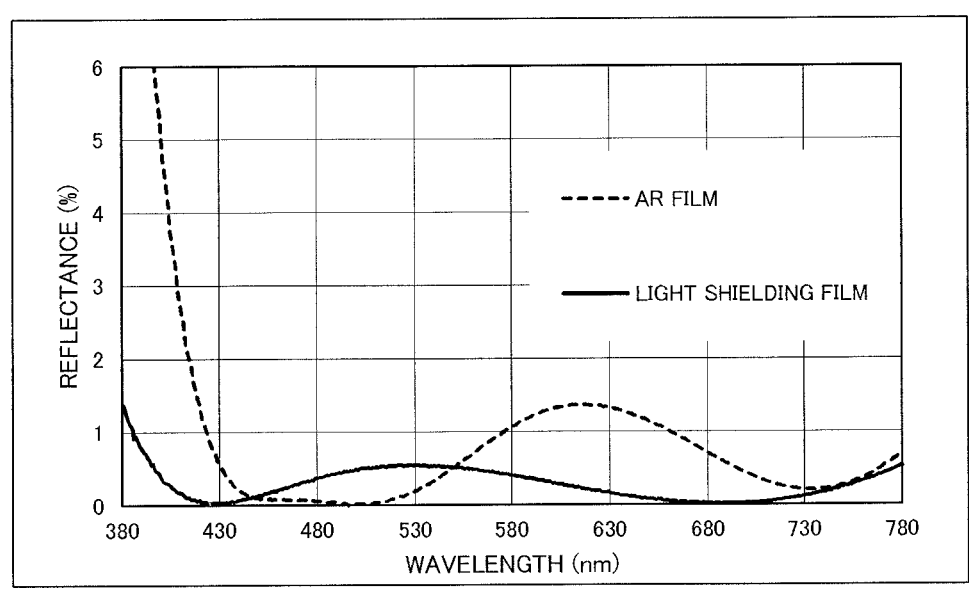

FIG. 21 is a graph of each of reflectance distributions at a first thin film portion and a second thin film portion of the sample in FIG. 17.

DETAILED DESCRIPTION OF THE INVENTION

Hereinafter, exemplary embodiments according to the present invention will be described with reference to the drawings as appropriate.

The present invention is not limited to the following examples.

Figure 1B:
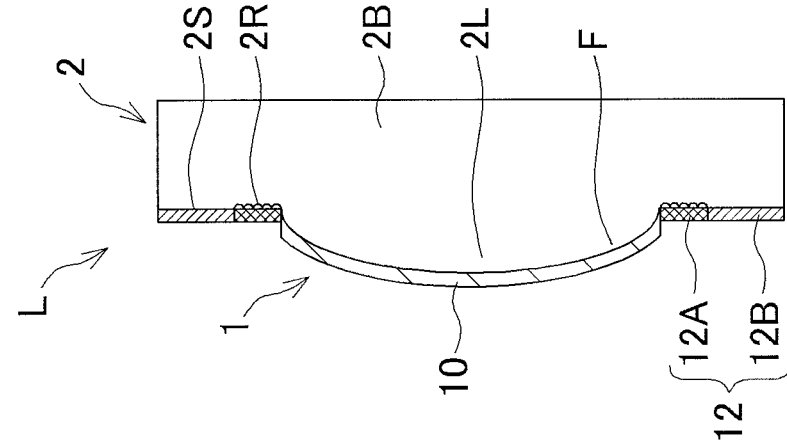
FIG. 1B is a side view of the light shielding AR lens member obtained by forming an optical thin film according to a first embodiment of the present invention on a base member.
Figure 1A:
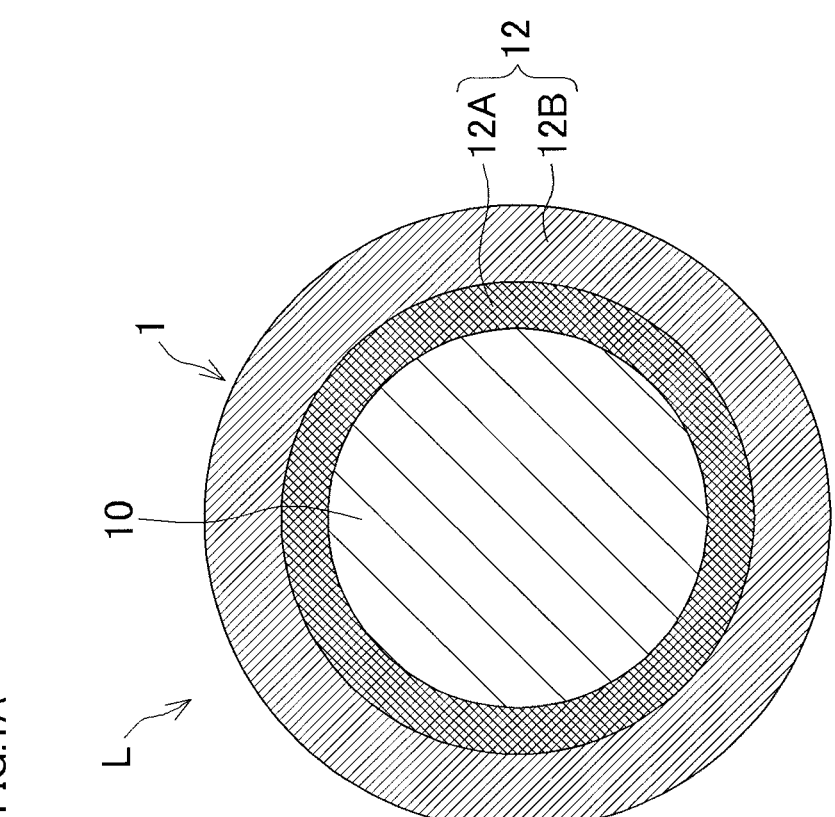
FIG. 1A is a back view of a light shielding AR lens member obtained by forming an optical thin film according to a first embodiment of the present invention on a base member.

As shown in FIG. 1, an optical thin film 1 according to a first embodiment of the present invention is formed on a film formation surface F of a base member 2 having a disc shape.

As the material of the base member 2, plastic is used, thermosetting resin is preferably used, and for example, polyurethane resin, thiourethane resin, episulfide resin, polycarbonate resin, polyester resin, acrylic resin, polyethersulfone resin, poly-4-methylpentene-1 resin, diethylene glycol bisaryl carbonate resin, or a combination of these resins is used. The material of the base member 2 may be a material other than plastic, such as glass.

The base member 2 with the optical thin film 1 is used as a light shielding AR lens member L in a lens unit of a camera module. The base member 2 with the optical thin film 1 may be used for purposes other than the lens unit.

The base member 2 is a base member on which the optical thin film 1 is formed. In particular, in the case of a plate shape, the base member 2 is a substrate. The base member 2 is translucent, and the transmittance of the base member 2 for visible light that is light having a wavelength in a visible range is almost 100%. Here, the visible range is not shorter than 400 nm and not longer than 750 nm. The base member 2 has a flat plate-shaped base portion 2B and a lens portion 2L which bulges from the base portion 2B to form a convex lens at the center on the film formation surface F side of the base portion 2B, namely, back side of the base portion 2B.

The base portion 2B has a disc shape having a diameter of about 8 mm.

The outer shape of the lens portion 2L is a circular shape having a diameter of about 4 mm. The surface of the lens portion 2L is subjected to mirror finishing. The mirror finishing may be omitted.

A roughened surface portion 2R having a grained shape with minute irregularities, for example, projections and recesses having a height of about several micrometers, and having a ring shape in a back view is formed around the lens portion 2L in the base member 2. The roughened surface portion 2R scatters light that passes therethrough. Due to such scattering, the roughened surface portion 2R appears cloudy to the naked eye. Furthermore, a peripheral flat portion 2S which has a ring shape in a back view and is flat is formed on the radially outer side of the roughened surface portion 2R. The roughened surface portion 2R has a width of about 1 mm.

The roughened surface portion 2R may be molded by a mold having, on an inner surface thereof, a shape corresponding to the minute irregularities, or may be formed by applying and adhering particles. The roughened surface portion 2R may not necessarily have a grained shape, or may be omitted. Alternatively, the peripheral flat portion 2S may be omitted, and the roughened surface portion 2R may be formed so as to extend to the periphery of the film formation surface F of the base member 2. The lens portion 2L may be a recessed concave lens rather than a bulging convex lens, or may be provided with a plurality of lenses. At least any of the size of the base member 2, the size of a portion of the base member 2, and the position thereof relative to the entirety may be changed from those described above.

The film formation surface F with the optical thin film 1 and the lens portion 2L of the base member 2 are placed so as to be inside the lens unit. In addition, a surface of the base portion 2B, opposed to the lens portion 2L, that is, the surface on the side opposite to the film formation surface F is flat, and is placed so as to be the outer surface of the lens unit.

The light shielding AR lens member L may be placed in another form in the lens unit. In addition, one or more intermediate films may be placed between the base member 2 and the optical thin film 1. The optical thin film 1, namely, film formation surface F, may be placed on the surface on the side opposite to the lens portion 2L, instead of the surface on the lens portion 2L side or in addition to being placed on the surface on the lens portion 2L side. The surface, of the base portion 2B, on the side opposite to the film formation surface F may have a curved shape.

The optical thin film 1 has a first thin film portion 10 and a second thin film portion 12.

The first thin film portion 10 is placed on the surface of the lens portion 2L (first film formation portion). The first thin film portion 10 is an optical multilayer film having an anti reflection (AR) function. At the first thin film portion 10, no resist or other materials, that is, materials other than the materials forming the first thin film portion 10 and the second thin film portion 12 remain. The first thin film portion 10 is not limited to the AR film.

The second thin film portion 12 has a ring shape in a back view, and is placed on the surface of the roughened surface portion 2R and the surface of the peripheral flat portion 2S (second film formation portion). The second thin film portion 12 is a light shielding film having a light cutting function that is a function to cut at least visible light. At the second thin film portion 12, no resist or other materials remain. The second thin film portion 12 is not limited to the light shielding film. The light shielding film may be a single-layer film, or may be a multilayer film having a plurality of layers. Cutting of light includes complete cutting in which the transmittance is approximately 0% in the entire visible range, incomplete cutting in which the transmittance is about 10% or lower in the visible range, and partial cutting in which the transmittance is reduced before and after transmission.

The second thin film portion 12 has a second A thin film portion 12A on the roughened surface portion 2R, and a second B thin film portion 12B on the peripheral flat portion 2S. The film configurations of the second A thin film portion 12A and the second B thin film portion 12B are the same, and the difference therebetween is whether the thin film portion is placed on the roughened surface portion 2R or the peripheral flat portion 2S. The placement of the first thin film portion 10 and the second thin film portion 12 is not limited to such placement in which the ring-shaped second thin film portion 12 is in contact with the outside of the first thin film portion 10 having a disc shape in a back view. For example, at the roughened surface portion 2R, the first thin film portion 10 and the second thin film portion 12 may overlap each other or be away from each other. In addition, the second thin film portion 12 may not necessarily be placed on a part or the entirety of the peripheral flat portion 2S.

Figure 2B:
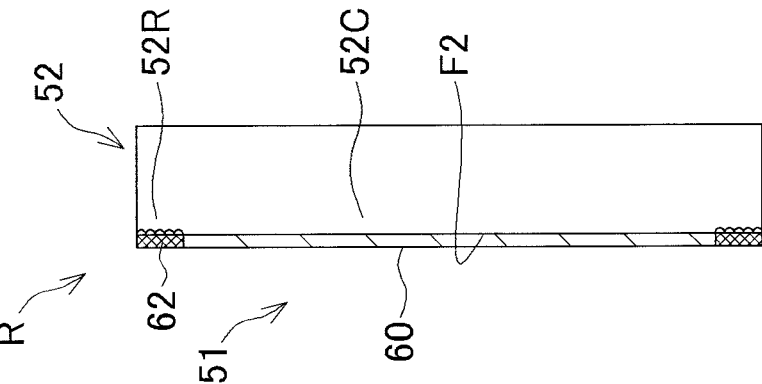
FIG. 2B is a side view of the infrared ray cutting member obtained by forming an optical thin film according to a second embodiment of the present invention on a base member.
Figure 2A:
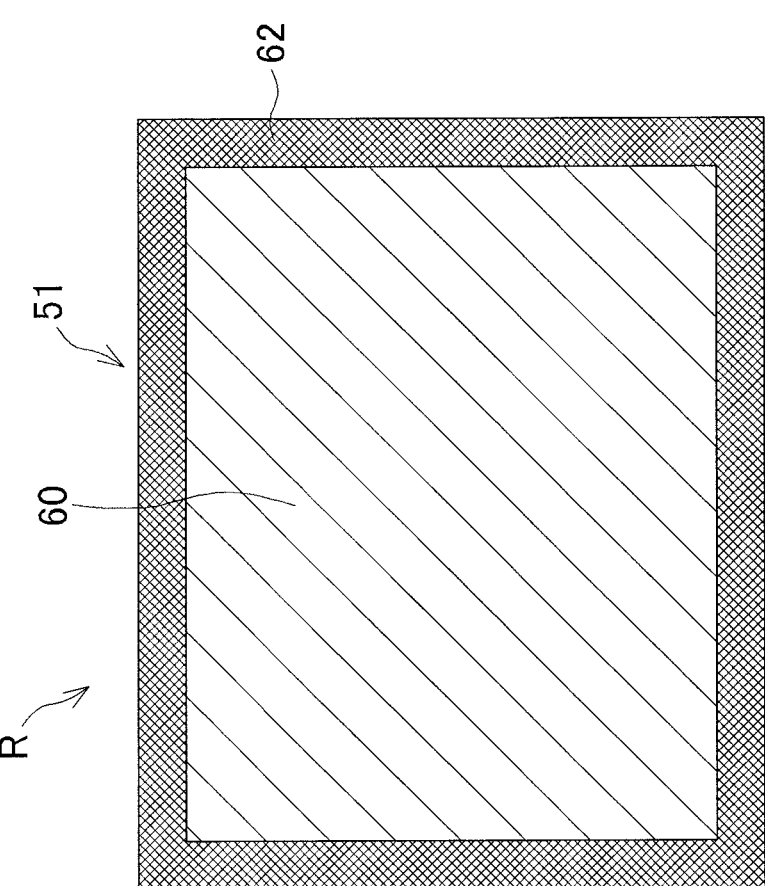
FIG. 2A is a back view of an infrared ray cutting member obtained by forming an optical thin film according to a second embodiment of the present invention on a base member.

As illustrated in FIG. 2, an optical thin film 51 according to a second embodiment of the present invention is formed on a film formation surface F2 (back surface) of a rectangular plate-shaped base member 52 made of plastic. The second embodiment has the same modifications as the first embodiment as appropriate. For example, the base member 52 may be made of glass or the like.

The base member 52 with the optical thin film 51 is used as an infrared ray cutting member R. The base member 52 with the optical thin film 51 may be used other than as the infrared ray cutting member R.

The base member 52 has a center portion 52C and a rectangular frame-shaped peripheral portion 52R. The film formation surface F2 side of the center portion 52C is subjected to mirror finishing. In addition, the film formation surface F2 side of the peripheral portion 52R is roughened as in the roughened surface portion 2R of the first embodiment.

The optical thin film 51 has a first thin film portion 60 and a second thin film portion 62.

The first thin film portion 60 has a rectangular shape in a back view, and is placed on the back surface of the center portion 52C (first film formation portion). The first thin film portion 60 is an optical multilayer film having an infrared ray cutting function. At the first thin film portion 60, no resist and other materials remain except for substances such as water that may adhere in the air. The first thin film portion 60 is not limited to the infrared ray cutting film.

The second thin film portion 62 has a rectangular frame shape in a back view, and is placed on the back surface of the peripheral portion 52R (second film formation portion). The second thin film portion 62 is formed so as to be the same as the second thin film portion 12 of the first embodiment, except for the shape.

The radially inner boundary of the second thin film portion 62 is in contact with the boundary of the first thin film portion 60. The placement of the first thin film portion 60 and the second thin film portion 62 is not limited to such placement in which the frame-shaped second thin film portion 62 is in contact with the outside of the first thin film portion 60 having a rectangular shape in a back view.

The optical thin films 1 and 51 of the first and second embodiments are each manufactured using a washing-time removal film W (see FIG. 3 and FIG. 4) which is finally removed by washing. The washing-time removal film W is a production intermediate that is formed during manufacture and does not remain after manufacture.

The washing-time removal film W is aluminum, an aluminum alloy, or an aluminum compound. The aluminum compound is suitably a compound containing aluminum as a main component. The main component may be a component whose proportion by weight is higher than that of the other components, or may be a component whose proportion by volume is higher than that of the other components.

The washing-time removal film W is, for example, aluminum (Al), aluminum oxide ($Al_2O_3$), aluminum nitride (AlN), or aluminum oxynitride (AlON). In AlON, the ratio between oxygen atoms and nitrogen atoms may be any ratio, and AlON may have properties similar to $Al_2O_3$ due to the number of oxygen atoms being larger than that of nitrogen atoms, may have properties similar to AlN due to the number of oxygen atoms being smaller than that of nitrogen atoms, or may include substantially the same numbers of oxygen atoms and nitrogen atoms.

Figure 5:
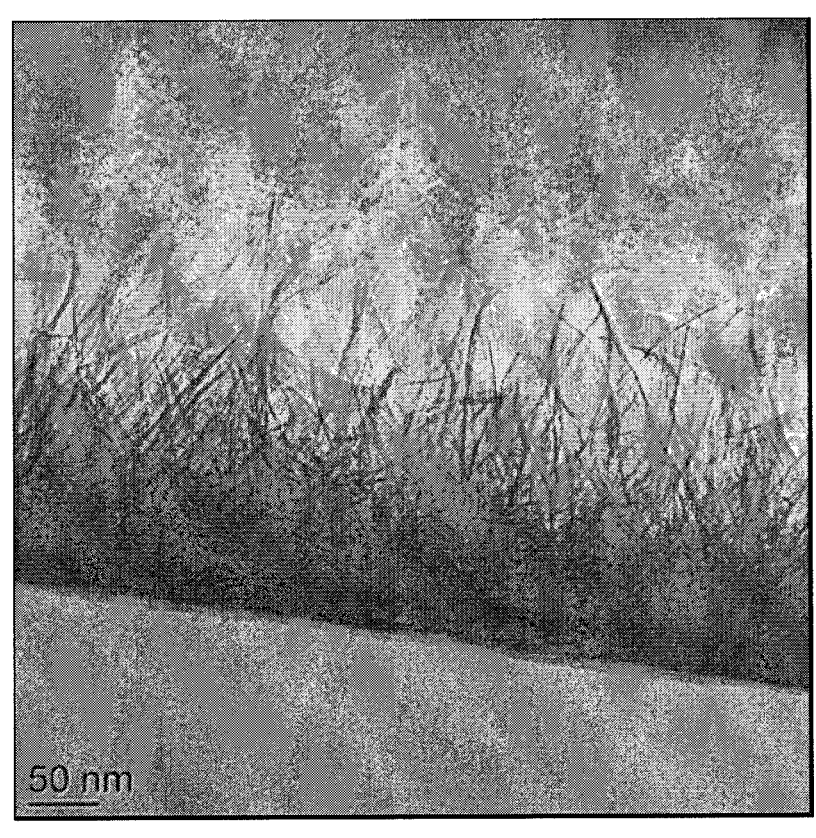
FIG. 5 is a micrograph showing a structure example of a washing-time removal film related to the present invention.
Figure 6:
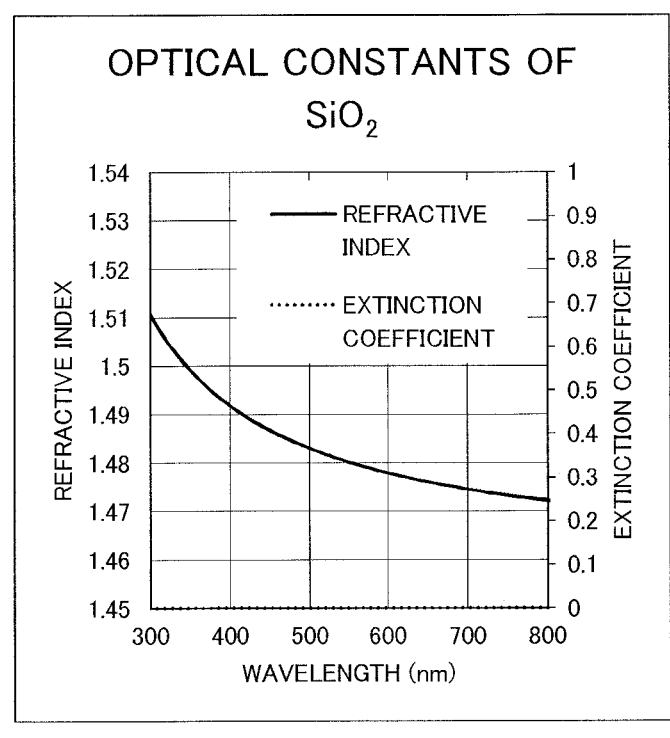
FIG. 6 is a graph related to optical constants of $SiO_2$.
Figure 7:
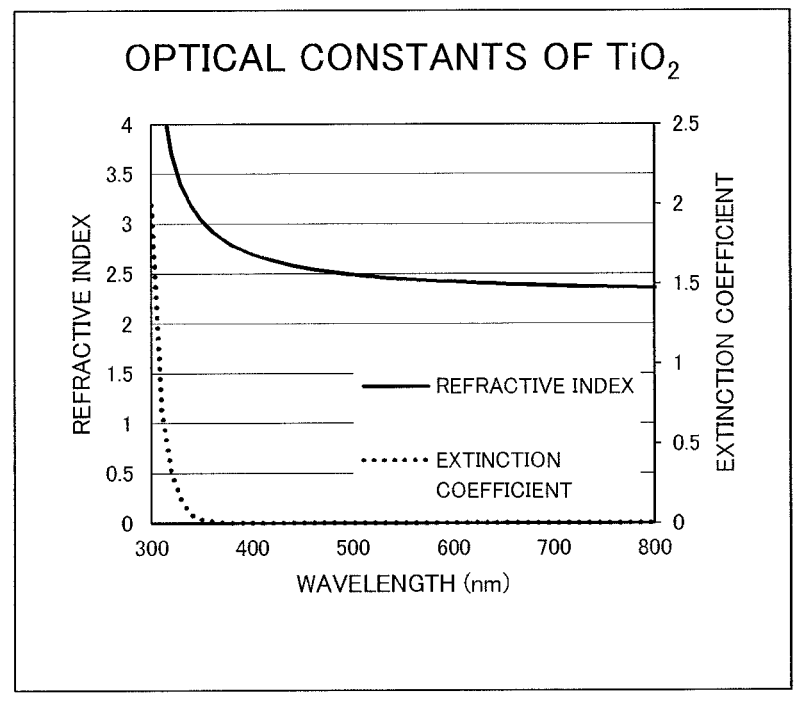
FIG. 7 is a graph related to optical constants of $TiO_2$.
Figure 8:
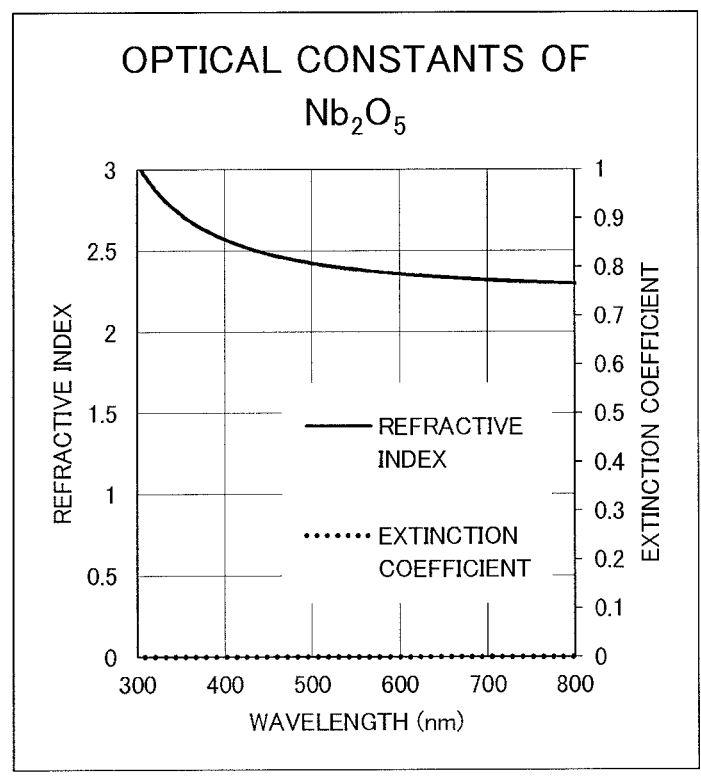
FIG. 8 is a graph related to optical constants of $Nb_2O_5$.
Figure 9:
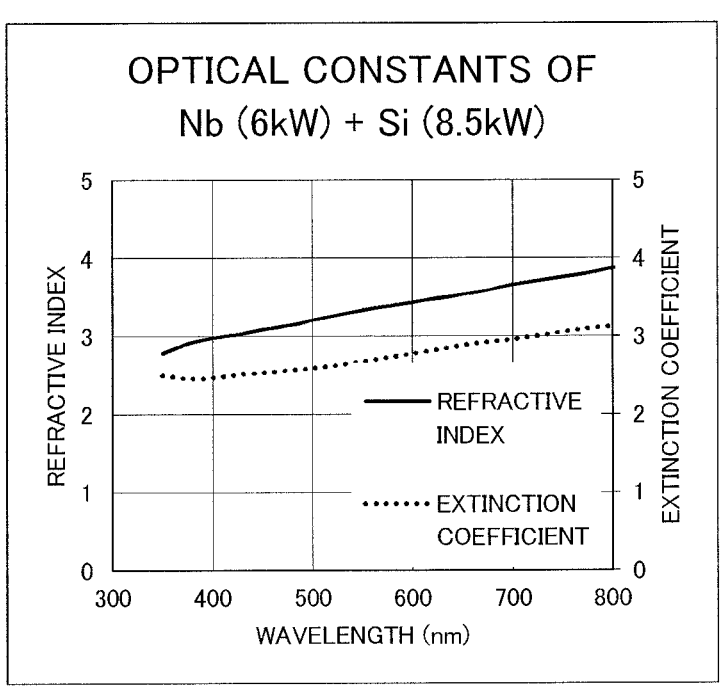
FIG. 9 is a graph related to optical constants of Nb+Si (Nb and Si sputtering source input power in sputtering is 6 kW and 8.5 kW, respectively).

The washing-time removal film W has at least one of a fine fluff-like structure, for example, as shown in FIG. 5 (AlN), a pyramid group-like structure, and a pinholder-like structure (hereinafter, referred to as "fluff-like structure or the like" as appropriate). Due to such a fluff-like structure or the like, the washing-time removal film W is provided with properties that a light shielding film or the like is allowed to be formed thereon and removal such as peeling is enabled by washing using at least one of running water and ultrasonic waves, for example.

The washing-time removal film W having a fluff-like structure or the like is formed from a washing-time removal base film WB which does not have a fluff-like structure or the like but is suitable for direct film formation by physical vapor deposition (PVD), such as vacuum deposition, sputtering. The washing-time removal film W is formed, for example, by performing at least one of ultrasonic treatment of applying ultrasonic waves and hot water immersion treatment of immersion in hot water, on the washing-time removal base film WB.

The washing-time removal film W is not strictly removed completely by washing, but may remain slightly after the optical thin film 1 is formed. Even in this case, the remaining material is aluminum, an aluminum alloy, or an aluminum compound, and does not substantially affect the optical characteristics of the optical thin film 1. The present invention includes the case where a part of the washing-time removal film W remains as described above.

The optical thin film 1 of the first embodiment is manufactured, for example, by forming the first thin film portion 10 on the lens portion 2L, forming the washing-time removal film W on the first thin film portion 10, forming a light shielding film for the second thin film portion 12 on the roughened surface portion 2R, on the peripheral flat portion 2S, and on the washing-time removal film W, and then removing the washing-time removal film W together with the light shielding film formed thereon by washing. Here, since the light shielding film on the roughened surface portion 2R and on the peripheral flat portion 2S remain, even after washing, the second thin film portion 12 having a ring shape in a back view is formed.

The optical thin film 51 of the second embodiment is manufactured, for example, by forming the first thin film portion 60 on a center portion of the film formation surface F2, forming the washing-time removal film W on the first thin film portion 60, forming a light shielding film for the second thin film portion 62 on the entirety of the film formation surface F2 with the first thin film portion 60 and the washing-time removal film W, and then removing the washing-time removal film W together with the light shielding film formed thereon by washing. Here, since the light shielding film on a peripheral portion of the film formation surface F2 remain, even after washing, the second thin film portion 62 having a rectangular frame shape in a back view is formed.

Further modifications of the above embodiments or modifications will be described below.

In the first embodiment, a light shielding film may be formed on the center portion of the film formation surface F, and an AR film may be formed on the peripheral portion of the film formation surface F2.

In the second embodiment, a light shielding film may be formed on the center portion of the film formation surface F, and an infrared ray cutting film may be formed on the peripheral portion of the film formation surface F.

The manufacture of the film using the washing-time removal film W according to the present invention is not limited to the above embodiments and modifications, and is applicable to formation of different types of film portions on a plurality of portions of various film formation surfaces. For example, AR film portions having different layer structures may be formed on the center portion and the peripheral portion of the film formation surface F or F2, respectively. Alternatively, mirror film portions having different layer structures may be formed on the center portion and the peripheral portion of the film formation surface F or F2, respectively. An AR film portion may be formed on the center portion of the film formation surface F or F2, and a mirror film portion may be formed on the peripheral portion thereof, or each film portion may be formed in the reversed placement. An AR film portion may be formed on the center portion of the film formation surface F or F2, and an infrared ray cutting film portion may be formed on the peripheral portion thereof, or each film portion may be formed in the reversed placement. An infrared ray cutting film portion may be formed on the center portion of the film formation surface F or F2, and a mirror film portion may be formed on the peripheral portion thereof, or each film portion may be formed in the reversed placement. The placement of each film portion is not limited to the center portion and the peripheral portion. The present invention may be applied to an optical thin film having three or more types of film portions.

An optical thin film according to a third embodiment of the present invention is formed so as to be the same as in the first embodiment, except for the manufacturing method. The members, portions, for example, that are the same as those in the first embodiment are denoted by the same reference characters as appropriate, and the description thereof is omitted.

In the manufacture of the optical thin film 1 of the third embodiment, for example, the first thin film portion 10 is formed on the roughened surface portion 2R, on the peripheral flat portion 2S, and on the lens portion 2L, namely, on film formation surface F, the washing-time removal film W is formed on the first thin film portion 10. After that, the first thin film portion 10 and the washing-time removal film W on the roughened surface portion 2R and on the peripheral flat portion 2S are removed by laser beam irradiation or the like.

Then, the subsequent manufacturing method is the same as in the first embodiment. That is, in the subsequent manufacture, a light shielding film for the second thin film portion 12 is formed on the roughened surface portion 2R, on the peripheral flat portion 2S, and on the washing-time removal film W, and the washing-time removal film W is then removed together with the light shielding film formed thereon by washing. Here, since the light shielding film on the roughened surface portion 2R and on the peripheral flat portion 2S remain, even after washing, the second thin film portion 12 having a ring shape in a back view is formed.

The third embodiment has the same modifications as the first embodiment and the second embodiment as appropriate.

Next, preferred examples of the present invention and a comparative example not belonging to the present invention will be described.

The present invention is not limited to the following examples. Also, according to interpretation of the present invention, the following examples may be substantially regarded as comparative examples, or the following comparative example may be substantially regarded as an example.

Example 1 corresponds to the light shielding AR lens member L of the first embodiment described above.

In Example 1, as shown in Table 1 below, the first thin film portion 10 (AR film) of the optical thin film 1 is an optical multilayer film having five layers in total, and is a film in which low refractive index layers each formed from a low refractive index material and high refractive index layers each formed from a high refractive index material are alternated. More specifically, in the first thin film portion 10, the first, third, and fifth layers, that is, odd number layers counted from the base member 2 side are low refractive index layers made of $SiO_2$ ($SiO_2$ layers), and the second and fourth layers, that is, even number layers counted from the base member 2 side are high refractive index layers made of $TiO_2$ ($TiO_2$ layers). The washing-time removal base film WB ($Al_2O_3$) which is not a component of the first thin film portion 10 is listed as a sixth layer in Table 1.

Also, as shown in Table 2 below, the second thin film portion 12 as the light shielding film of the optical thin film 1 is an optical multilayer film having nine layers in total, and is a film in which low refractive index layers and high refractive index layers are alternated. More specifically, in the first thin film portion 10, the first, third, fifth, seventh, and ninth layers, that is, odd number layers counted from the base member 2 side are $SiO_2$ layers, the second layer, that is a part of even number layers counted from the base member 2 side is a high refractive index layer made of niobium oxide ($Nb_2O_5$) ($Nb_2O_5$ layer), and the fourth, sixth, and eighth layers, that is, the others of the even number layers counted from the base member 2 side are high refractive index layers made of a niobium silicon alloy (Nb+Si) (Nb+Si layers). The Nb+Si layers are light absorbing layers that absorb visible light, and behave similarly to the high refractive index layers due to the characteristics thereof.

The low refractive index material may be calcium fluoride ($CaF_2$), magnesium fluoride ($MgF_2$), or a mixture of two or more of these materials including $SiO_2$. Also, the higher refractive index material may be zirconium oxide ($ZrO_2$), tantalum oxide ($Ta_2O_5$), niobium oxide ($Nb_2O_5$), hafnium oxide ($HfO_2$), selenium oxide ($CeO_2$), aluminum oxide ($Al_2O_3$), yttrium oxide ($YO_2$), or a mixture of two or more of these materials including $TiO_2$. In the optical multilayer film as the first thin film portion 10, one high refractive index material and one low refractive index material are used, so that the film design is easy and the film formation cost is low.

TABLE 2

| Layer | Film material | Film thickness (nm) |
|---|---|---|
| First layer | $SiO_2$ | 100.0 |
| Second layer | $Nb_2O_5$ | 14.5 |
| Third layer | $SiO_2$ | 35.6 |
| Fourth layer | NbSi | 8.0 |
| Fifth layer | $SiO_2$ | 80.6 |
| Sixth layer | NbSi | 200.0 |
| Seventh layer | $SiO_2$ | 66.1 |
| Eighth layer | NbSi | 7.5 |
| Ninth layer | $SiO_2$ | 84.3 |

Next, a manufacturing method of Example 1 will be described.

The manufacturing method, including a manufacturing apparatus, for the optical thin film 1 according to the present invention is not limited to the following embodiment.

In the manufacture of Example 1, the first thin film portion 10 of the optical thin film 1, the washing-time removal base film WB, and the second thin film portion 12 are all formed by DC sputtering with a DC sputtering film formation apparatus. In the manufacture of Example 1, $Al_2O_3$ is used as the washing-time removal base film WB.

Table 3 below shows the process conditions for various types of sputtering.

FIG. 6 to FIG. 9 show optical constants, that is, refractive index distributions and extinction coefficients in the visible range and adjacent ranges of various materials.

At least any one of the first thin film portion 10, the washing-time removal base film WB, and the second thin film portion 12 may be formed by another method such as vapor deposition. In addition, instead of the DC sputtering film formation apparatus, an RF sputtering film formation apparatus may be used. Furthermore, the number of layers of each of various films and the film thickness of each layer can be changed as appropriate.

TABLE 3

| Film material | Target material | Sputtering source | | | Radical source | | | | Treatment time Seconds | Vapor deposition rate nm/sec |
|---|---|---|---|---|---|---|---|---|---|---|
| | | Input power (kW) | Ar gas introduction amount (ccm) | $O_2$ gas introduction amount (ccm) | Input power (kW) | Ar gas introduction amount (ccm) | $O_2$ gas introduction amount (ccm) | $N_2$ gas introduction amount (ccm) | | |
| Pretreatment | — | 0 | 0 | 0 | 3 | — | 500 | — | 30 | — |
| $SiO_2$ | Si | 8 | 100 | 0 | 3 | 0 | 80 | 0 | Film | 0.36 |
| $TiO_2$ | Ti | 6 | 120 | 0 | 0 | 0 | 80 | 0 | thickness + | 0.25 |
| $Nb_2O_5$ | Nb | 6 | 120 | 0 | 3 | 0 | 200 | 0 | vapor | 0.2 |
| Nb + Si | Nb | 6 | 120 | 0 | 0 | 0 | 0 | 0 | deposition | 0.3 |
| | Si | 8.5 | 120 | 0 | | | | | rate | |

TABLE 1

| Layer | Material | Film thickness (nm) |
|---|---|---|
| First layer | $SiO_2$ | 202.8 |
| Second layer | $TiO_2$ | 19.1 |
| Third layer | $SiO_2$ | 37.0 |
| Fourth layer | $TiO_2$ | 26.4 |
| Fifth layer | $SiO_2$ | 97.1 |
| Sixth layer | $Al_2O_3$ | 100.0 |

As shown in FIG. 3A and FIG. 4B, a mask M is set above the film formation surface F of the base member 2 before film formation that is placed in a vacuumed film formation chamber of the sputter film formation apparatus in a horizontal state shown in FIG. 4A where the film formation surface F (back surface) faces upward. The mask M has a plate-shaped base MB and a through hole MH formed at the center of the base MB in a shape corresponding to the shape of the first thin film portion 10. The mask M is supported by a film formation holder via a support.

In the manufacturing method for the optical thin film 1, for example, various arrangements and installation numbers, are not limited to those described above. For example, the base member 2 and the mask M may be in a vertical orientation, or a plurality of base members 2 may be arranged lengthwise and breadthwise, and the mask M may have a plurality of through holes corresponding to this arrangement.

Next, as shown in FIG. 3B and FIG. 4C, the first thin film portion 10 is formed, and then the washing-time removal base film WB is formed. The first thin film portion 10 and the washing-time removal base film WB may be produced by apparatuses different from each other.

That is, first, various targets are set, the film formation chamber is vacuumed, and further, as shown as "Pretreatment" in Table 3, O₂ gas is supplied from a radical source into the film formation chamber at a flow rate of 500 ccm for 30 seconds in a state where the O₂ gas is made into radical oxygen by applying a high-frequency voltage, whereby the base member 2 and the mask M are cleaned. More specifically, as a result of such irradiation with the radical oxygen, even if organic matter and the like have adhered to the base member 2 and the mask M, the organic matter and the like are decomposed and peeled off by the radical oxygen and ultraviolet rays generated by plasma. Such cleaning improves the adhesion of a film to be formed later.

Then, the first layer (SiO₂ layer) of the first thin film portion 10 is sputtered under the process conditions described above (Table 3). Here, a Si sputtering source is operated with introduction of argon gas (Ar gas), and oxygen gas (O₂ gas) is introduced as a radical source into the film formation chamber. The mask M is placed between the base member 2 and the sputtering source. Next, the second layer (TiO₂ layer) of the first thin film portion 10 is sputtered in the same manner. Here, a Ti sputtering source is operated, and O₂ gas is introduced as a radical source into the film formation chamber. Subsequently, the third to fifth layers are sequentially sputtered in the same manner, so that the first thin film portion 10 is formed. Instead of the sputtering source or together with the sputtering source, Ar gas may be introduced with the radical source. Ar gas may be changed with a noble gas other than Ar. Such change of Ar gas may also be made in other film formation as appropriate.

Next, the washing-time removal base film WB (Al₂O₃) is sputtered on the first thin film portion 10 under the process conditions described above (Table 3). Here, an Al sputtering source is operated with introduction of Ar gas, and the radical source is operated as oxygen radicals.

The first thin film portion 10 and the washing-time removal base film WB are formed on the lens portion 2L of the base member 2 through the through hole MH of the mask M.

Subsequently, as shown in FIG. 3C and FIG. 4D, the base member 2 with the first thin film portion 10 and the washing-time removal base film WB is taken out from the sputtering film formation apparatus once.

Then, as shown in FIG. 3D, the base member 2 with the first thin film portion 10 and the washing-time removal base film WB is immersed in hot water HW in a water tank T. As a result, as shown in FIG. 3E and FIG. 4E, the washing-time removal base film WB becomes the washing-time removal film W having a fluff-like structure or the like. That is, the structure of Al₂O₃ uniformly distributed in the washing-time removal base film WB changes to exhibit a fluff-like structure or the like with dissolution into the hot water HW. In other words, the washing-time removal base film WB gradually changes to the washing-time removal film W such that while the washing-time removal base film WB is partially dissolving in the hot water HW as appropriate, a large number of minute fluffs, pyramids, cones, needles, etc., grow in the film thickness direction. The change from the washing-time removal base film WB to the washing-time removal film W can be regarded as etching since the strength of the film decreases due to having a fluff-like structure or the like. On the other hand, the hot water HW does not cause any adverse effect on the first thin film portion 10 such as deformation and short-term embrittlement. The orientation (direction) of the base member 2 and the like during immersion is not limited to the vertical orientation shown in FIG. 3. In addition to the immersion in the hot water, etching can also be performed by applying ultrasonic waves together with immersion in hot water.

From the viewpoint of obtaining a fluff-like structure or the like in as short a time as possible, the temperature of the hot water HW is 90° C., preferably not lower than 60° C. and not higher than 100° C., more preferably not lower than 80° C. and not higher than 100° C., and further preferably not lower than 90° C. and not higher than 100° C. To raise the temperature to 100° C. or higher, the water has to be subjected to special treatment such as pressurizing or a liquid other than water has to be used, which takes time and effort.

Also, from the viewpoint of obtaining a fluff-like structure or the like in as short a time as possible, the immersion time in the hot water HW is preferably not shorter than 2 seconds and not longer than 10 minutes, more preferably not shorter than 5 seconds and not longer than 5 minutes, and further preferably not shorter than 15 seconds and not longer than 3 minutes. If the immersion time is short, a fluff-like structure or the like is not obtained sufficiently, and if the immersion time is long, the treatment time is lengthened, which reduces the efficiency.

Then, as shown in FIG. 3F, the base member 2 with the first thin film portion 10 and the washing-time removal film W is taken out from the water tank T and returned to the sputter film formation apparatus, and as shown in FIG. 3G and FIG. 4F, the light shielding film for the second thin film portion 12 is formed on the entirety of the film formation surface F. The light shielding film may be produced by different apparatuses different from devices used to produce the first thin film portion 10 and the like.

That is, first, the first layer (SiO₂ layer) of the second thin film portion 12 is sputtered in the same manner as the SiO₂ layer of the first thin film portion 10, without using the mask M. Next, the second layer (Nb₂O₅ layer) of the second thin film portion 12 is sputtered under the process conditions described above (Table 3). Here, a Nb sputtering source is operated with introduction of Ar gas, and O₂ gas is introduced as a radical source into the film formation chamber. Subsequently, the third layer (SiO₂ layer) of the second thin film portion 12 is sputtered in the same manner. Next, the fourth layer (Nb+Si layer) of the second thin film portion 12 is sputtered in the same manner. In the sputtering of the Nb+Si layer, the Nb sputtering source and the Si sputtering source are operated simultaneously, and the radical source is not operated. Subsequently, the fifth to seventh layers are sequentially sputtered in the same manner, so that the light shielding film for the second thin film portion 12 is formed on the roughened surface portion 2R of the base member 2, on the peripheral flat portion 2S, and on the washing-time removal film W.

After such formation of the light shielding film on the entire surface, as shown in FIG. 3H, the base member 2 with the light shielding film, the washing-time removal film W, and the first thin film portion 10 is placed in the water tank T again and immersed in the hot water HW.

As a result, as shown in FIG. 3I and FIG. 4G, the light shielding film on the washing-time removal film W becomes an embrittled second thin film portion 12E having cracks to have an embrittled structure. The change from the second thin film portion 12 to the embrittled second thin film portion 12E on the washing-time removal film W can be regarded as etching, and can be regarded as re-etching since this etching is second etching. In the re-etching, the second thin film portion 12 on the base member 2, and the first thin film portion 10 are not adversely affected by the embrittlement, for example, and the adhesion of the first thin film portion 10 and the second thin film portion 12 to the film formation surface F does not change.

Also, in the re-etching, the fluff-like structure or the like of the washing-time removal film W is made finer, and partial dissolution of the washing-time removal film W proceeds.

A water tank T for the washing-time removal film W and a water tank T for the second thin film portion 12 may be provided separately from each other. Also, these water tanks T may be different from each other in at least one of the temperature of and the immersion time in the hot water HW. Furthermore, the re-etching can have the same modifications as the first etching as appropriate. For example, in the re-etching, ultrasonic treatment may be performed instead of or together with hot water immersion treatment. In addition, the embrittled structure of the embrittled second thin film portion 12E is not limited to the cracks.

The base member 2 with the first thin film portion 10, the second thin film portion 12, the embrittled second thin film portion 12E, and the washing-time removal film W is taken out from the water tank T, and then washed with running water (see an arrow A) as shown in FIG. 3J. Washing may be performed by ultrasonic waves instead of or together with running water.

As a result, the embrittled second thin film portion 12E and the washing-time removal film W are separated from the first thin film portion 10, and as shown in FIG. 3K and FIG. 4H, the base member 2 with the optical thin film 1 in which the second thin film portion 12 is placed around the first thin film portion 10 so as to have a uniform film thickness, that is, the light shielding AR lens member L, is completed. That is, the washing-time removal film W and the second thin film portion 12 thereon are removed by washing, and the first thin film portion 10 appears on the surface of the lens portion 2L. As the result, the second thin film portion 12 is shifted from a state where the second thin film portion 12 is placed on the entirety of the film formation surface F to a state where the second thin film portion 12 is placed only on the surface of the roughened surface portion 2R and the surface of the peripheral flat portion 2S.

In such an optical thin film 1, $Al_2O_3$ as the washing-time removal film W has decreased adhesion to the first thin film portion 10, which is located therebelow, due to the fine fluff-like structure or the like, and is therefore completely removed by washing with at least one of running water and ultrasonic waves and does not remain. Also, due to the embrittled second thin film portion 12E having cracks and the washing-time removal film W having a fluff-like structure or the like, only the portion of the light shielding film above the lens portion 2L is selectively removed. The adhesion of the first thin film portion 10 to the surface of the lens portion 2L and the adhesion of the second thin film portion 12 to the surface of the roughened surface portion 2R and the surface of the peripheral flat portion 2S are both ensured, so that the first thin film portion 10 and the second thin film portion 12 at the respective portions are not peeled off by washing with at least one of running water and ultrasonic waves, and are not removed from the base member 2. As described above, even if the washing-time removal film W remains slightly, the remaining washing-time removal film W does not significantly affect the optical thin film 1 and the like.

Also, the washing-time removal film W can be removed without using any organic solvent, thus preventing the influence of an organic solvent on the optical thin film 1, the base member 2, and the intermediate films, for example. In particular, many of base members 2 made of plastic are weak against organic solvents, and may be dissolved or cracked due to the action of organic solvents, but in the removal of the washing-time removal film W, no organic solvent is used, so that such dissolution and cracking are prevented. Therefore, the formation of the optical thin film 1 using the washing-time removal film W is particularly effective for base members 2 made of plastic.

The water temperature of the running water may be any temperature, and from the viewpoint of ease of handling, the water temperature is preferably about room temperature (water temperature of tap water).

The flow rate of the running water may be any rate that allows the entireties of the embrittled second thin film portion 12E and the washing-time removal film W to be separated. The same applies to the output of ultrasonic waves.

The washing time which is the time to treat with at least one of running water and ultrasonic waves can be any time that allows the entireties of the embrittled second thin film portion 12E and the washing-time removal film W to be separated. From the viewpoint of shortening the time while ensuring sufficient washing, the washing time is preferably not shorter than 30 seconds and not longer than 10 minutes, more preferably not shorter than 1 minute and not longer than 5 minutes, and further preferably not shorter than 2 minutes and not longer than 3 minutes.

Figure 10:
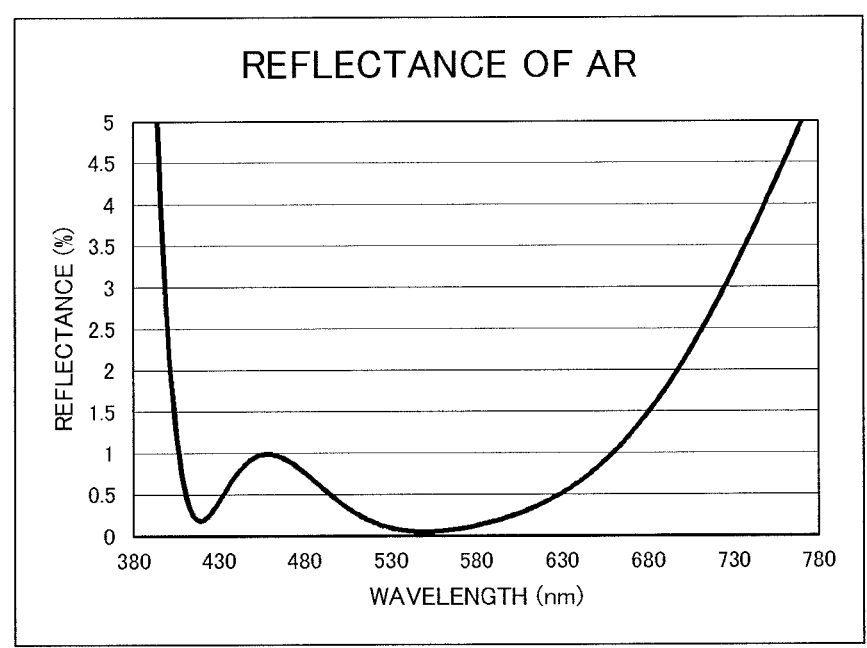
FIG. 10 is a graph of a reflectance distribution at a first thin film portion of Example 1.

FIG. 10 is a graph of a reflectance distribution in the visible range and adjacent ranges at the surface of the lens portion 2L (center point thereof) on which the first thin film portion 10 (AR film) of Example 1 is formed.

According to this graph, it is found that low reflection of visible light is realized at the lens portion 2L of Example 1.

Since the surface of the lens portion 2L is subjected to mirror finishing, the first thin film portion 10 is provided thereon, and the base member 2 is translucent, the lens portion 2L of Example 1 transmits most of visible light.

Figure 11:
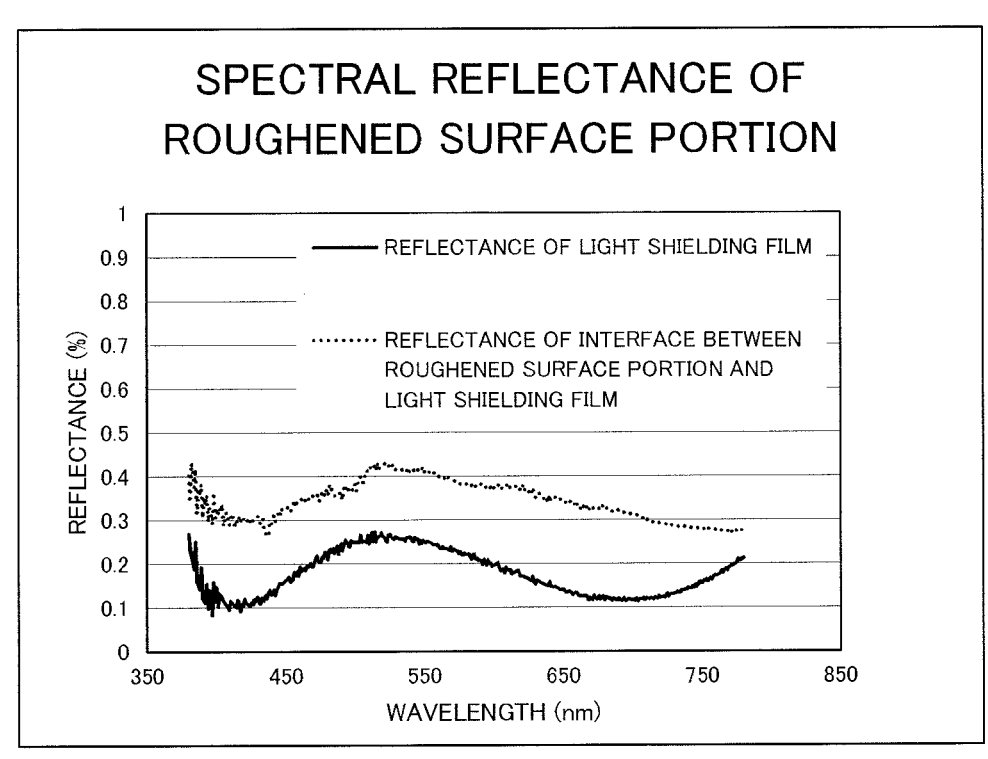
FIG. 11 is a graph of a reflectance distribution at a second thin film portion of Example 1.

FIG. 11 is a graph of reflectance distributions in the visible range and adjacent ranges for a reflectance of the surface of the roughened surface portion 2R, on which the second thin film portion 12 (light shielding film) of Example 1 is formed, for reflected light incident from the air and reflected on the second thin film portion 12 (second A thin film portion 12A) (reflectance of the light shielding film) and a reflectance of the surface of the roughened surface portion 2R for reflected light incident from the base member 2 side and reflected on the surface of the roughened surface portion 2R (reflectance of an interface).

The reflectance is measured as the ratio between test light emitted from a reflectometer and the light returned to the reflectometer. The test light is scattered by the irregularities of the roughened surface portion 2R, so that the reflectance of the light shielding film and the reflectance of the interface in Example 1 are both 0.5% or lower over the entire visible range and sufficiently low.

Figure 12:
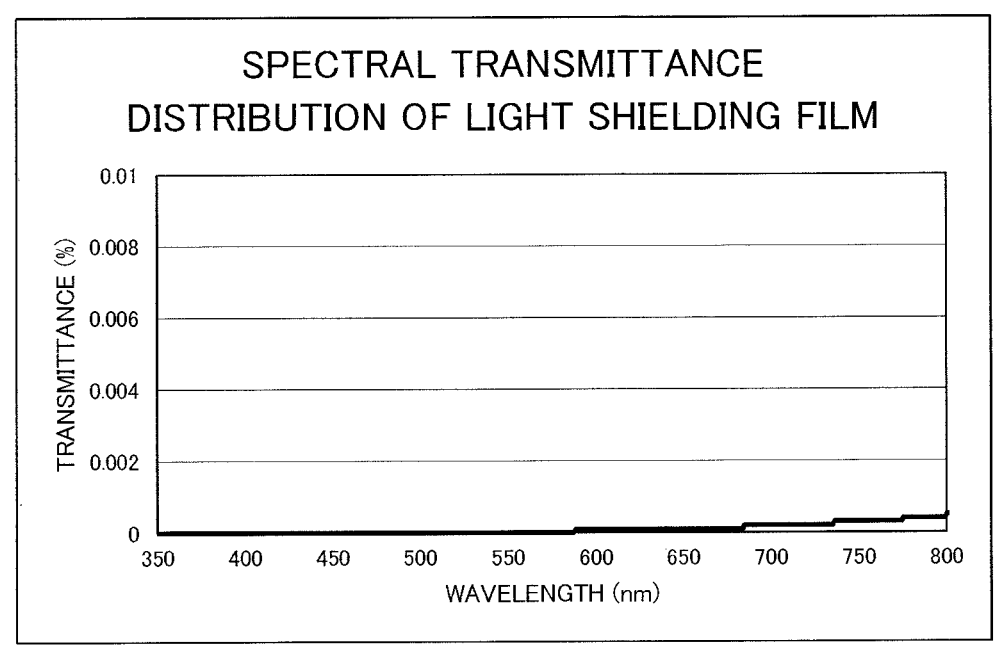
FIG. 12 is a graph of a transmittance distribution at the second thin film portion of Example 1.

FIG. 12 is a graph of a transmittance distribution in the visible range and adjacent ranges at the surface of the roughened surface portion 2R on which the second thin film portion 12 (light shielding film) of Example 1 is formed.

At the roughened surface portion 2R of Example 1, a very low transmittance is realized in the visible range and the adjacent ranges. Due to such a roughened surface portion 2R with the second thin film portion 12, the light shielding AR lens member L of Example 1 sufficiently suppresses generation of stray light in the lens unit.

Hereinafter, the uniformity of the film thickness in the second thin film portion 12 of Example 1 will be described with a comparative example.

In the comparative example, two types of masks, that is, the mask for the AR film 10Z and the bridged mask MZ, are required, but in Example 1, only one mask M for the first thin film portion 10 and the washing-time removal base film WB is required, so that the manufacture of Example 1 is easier than that of the comparative example.

Table 4 below shows the manufacturing conditions, etc., for modifications of the formation of the washing-time removal base film WB.

The topmost manufacturing conditions, etc., in Table 4 are those for Example 1. In addition, "EB" in Table 4 refers to electron beam.

TABLE 4

| Material | Method | Material form | Film formation conditions | Compound reaction method | Film thickness (nm) |
|---|---|---|---|---|---|
| $Al_2O_3$ | DC sputtering | Plate material target | Discharge power: 4 kW | Form Al film while applying oxygen radicals | 100 |
| Al | Vacuum deposition | Granules | EB heating: 7 kV, 200 A | Not used | 50 |
| $Al_2O_3$ | Vacuum deposition | Granules | EB heating: 7 kV, 200 A | Form film while introducing $O_2$ gas | 100 |
| Al | DC sputtering | Plate material target | Discharge power: 4 kW | Not used | 50 |
| AlN | DC sputtering | Plate material target | Discharge power: 4 kW | Form Al film while applying nitrogen radicals | 100 |
| AlON | DC sputtering | Plate material target | Discharge power: 4 kW | Form Al film while applying oxygen radicals and nitrogen radicals | 100 |

Figure 13:
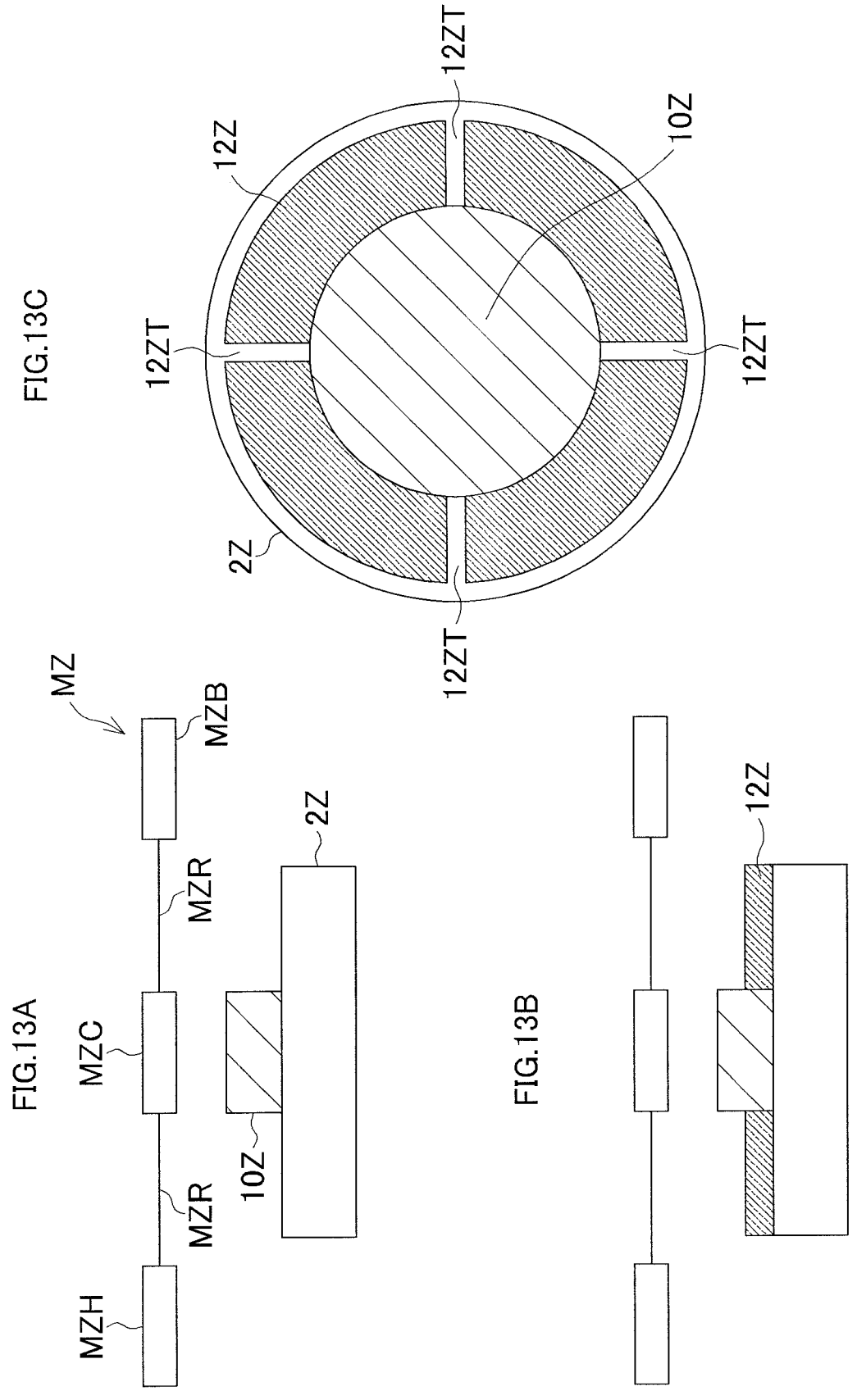
FIGS. 13A and B are schematic diagrams regarding manufacture of a ring-shaped light shielding film in a comparative example not belonging to the present invention.
FIG. 13C is a back view of a light shielding AR lens member LZ in the comparative example.

FIGS. 13A and 13B are schematic diagrams regarding manufacture of a ring-shaped light shielding film in the comparative example, and FIG. 13C is a back view of a light shielding AR lens member LZ in the comparative example.

In the comparative example, after an AR film 10Z is formed at the center as in Example 1, a light shielding film 12Z is formed around the AR film 10Z by a bridged mask MZ without forming the washing-time removal base film WB.

The bridged mask MZ includes a base MZB, a circular through hole MZH which is formed at the center thereof and has the same size as the light shielding AR lens member LZ, a center mask MZC which is located concentrically with the through hole MZH and is a disc having the same size as a lens portion 2LZ, and bridges MZR each of which extends from a through hole MZH outer portion of the base MZB inward on any of four sides and reaches the center mask MZC in order to support the center mask MZC.

The light shielding film 12Z is formed in a ring shape by the through hole MZH excluding the center mask MZC portion in the bridged mask MZ. The center mask MZC prevents formation of a light shielding film on the AR film 10Z.

However, during the formation of the light shielding film 12Z, the multiple (four) bridges MZR which support the center mask MZC prevent the film material from reaching a base member 2Z. Therefore, the light shielding film 12Z of the comparative example has thinned portions 12ZT corresponding to the bridges MZR, and thus the film thickness thereof becomes non-uniform. At each thinned portion 12ZT, no film material of the light shielding film 12Z may be present (non-film-formation portion). Such thinned portions 12ZT are formed even if the bridges MZR are made as small as possible in a state where the center mask MZC can be supported.

In contrast, owing to the washing-time removal film W, the second thin film portion 12 of Example 1 is formed in a ring shape such that the uniformity of the film thickness is very high.

That is, as shown in the second manufacturing conditions, etc., from the top in Table 4, the washing-time removal base film WB may be an Al film formed by vapor deposition.

Also, as shown in the third manufacturing conditions, etc., from the top in Table 4, the washing-time removal base film WB may be an $Al_2O_3$ film formed by vapor deposition.

Furthermore, as shown in the fourth manufacturing conditions, etc., from the top in Table 4, the washing-time removal base film WB may be an Al film formed by sputtering.

Furthermore, as shown in the fifth manufacturing conditions, etc., from the top in Table 4, the washing-time removal base film WB may be an MN film formed by sputtering. It is difficult to form an AlN film by ordinary vapor deposition.

In addition, as shown in the first manufacturing conditions, etc., from the bottom in Table 4, the washing-time removal base film WB may be an AlON film formed by sputtering. It is difficult to form an AlON film.

Alternatively, the washing-time removal base film WB may be a combination of these films, including Al alone.

In each of these washing-time removal base films WB, as in the washing-time removal base film WB of Example 1, a fine fluff-like structure or the like can be developed by hot water immersion treatment, and each of these washing-time removal base films WB can be made into a washing-time removal film W.

Example 2 corresponds to the second embodiment (infrared ray cutting member R) described above.

In Example 2, as shown in Table 5 below, the first thin film portion 60 (infrared ray cutting film) of the optical thin film 51 is an optical multilayer film having 45 layers in total, and is a film in which low refractive index layers ($SiO_2$ layers, odd number layers) and high refractive index layers ($TiO_2$ layers, even number layers) are alternated.

Also, the second thin film portion 62 (light shielding film) of the optical thin film 51 is formed so as to be the same as the second thin film portion 12 of Example 1.

Example 2 has the same modifications as Example 1 as appropriate, including the manufacture thereof.

Various conditions such as the immersion time in at least one of etching (FIGS. 3D and 3E) and re-etching (FIGS. 3H

TABLE 5

| Layer | 1 | 2 | 3 | 4 | 5 | 6 | 7 | 8 | 9 | 10 |
|---|---|---|---|---|---|---|---|---|---|---|
| Film material | SiO$_2$ | TiO$_2$ | SiO$_2$ | TiO$_2$ | SiO$_2$ | TiO$_2$ | SiO$_2$ | TiO$_2$ | SiO$_2$ | TiO$_2$ |
| Film thickness (nm) | 27.5 | 8.6 | 78.2 | 17.4 | 46.6 | 119.9 | 187.5 | 113.4 | 191.5 | 114.8 |
| Layer | 11 | 12 | 13 | 14 | 15 | 16 | 17 | 18 | 19 | 20 |
| Film material | SiO$_2$ | TiO$_2$ | SiO$_2$ | TiO$_2$ | SiO$_2$ | TiO$_2$ | SiO$_2$ | TiO$_2$ | SiO$_2$ | TiO$_2$ |
| Film thickness (nm) | 189.8 | 114.5 | 189.9 | 113.0 | 187.0 | 110.7 | 180.9 | 102.1 | 170.9 | 104.8 |
| Layer | 21 | 22 | 23 | 24| | 25 | 26 | 27 | 28 | 29 | 30 |
| Film material | SiO$_2$ | TiO$_2$ | SiO$_2$ | TiO$_2$ | SiO$_2$ | TiO$_2$ | SiO$_2$ | TiO$_2$ | SiO$_2$ | TiO$_2$ |
| Film thickness (nm) | 179.2 | 99.8 | 156.9 | 86.4 | 147.5 | 82.3 | 144.6 | 81.7 | 142.2 | 81.4 |
| Layer | 31 | 32 | 33 | 34 | 35 | 36 | 37 | 38 | 39 | 40 |
| Film material | SiO$_2$ | TiO$_2$ | SiO$_2$ | TiO$_2$ | SiO$_2$ | TiO$_2$ | SiO$_2$ | TiO$_2$ | SiO$_2$ | TiO$_2$ |
| Film thickness (nm) | 141.6 | 81.4 | 141.2 | 81.4 | 141.6 | 81.5 | 141.9 | 82.1 | 143.7 | 86.3 |

| Layer | 41 | 42 | 43 | 44 | 45 |
|---|---|---|---|---|---|
| Film material | SiO$_2$ | TiO$_2$ | SiO$_2$ | TiO$_2$ | SiO$_2$ |
| Film thickness (nm) | 149.3 | 26.4 | 14.1 | 35.4 | 79.5 |

Next, a manufacturing method of Example 2 will be described.

The manufacturing method, including a manufacturing apparatus, for the optical thin film 51 according to the present invention is not limited to the following embodiment.

In the manufacture of Example 2, the first thin film portion 60 of the optical thin film 51, the washing-time removal base film WB, and the second thin film portion 62 are all formed by DC sputtering in the same manner as in Example 1, except for the number of layers of the first thin film portion 60 and the shape of the mask M.

Alternatively, the first thin film portion 60 of the optical thin film 51 may be formed by vapor deposition. The process conditions for this case are shown in Table 6 below.

In the case where the first thin film portion 60 is formed by vapor deposition as described above, if the washing-time removal base film WB is also formed by vapor deposition (see the second and third manufacturing conditions and the like in Table 4), the first thin film portion 60 and the washing-time removal base film WB can be formed by the same apparatus, so that the ease of manufacture is ensured.

and 3I) may be adjusted according to the characteristics of the first thin film portion 60 (infrared ray cutting film).

Figure 14:
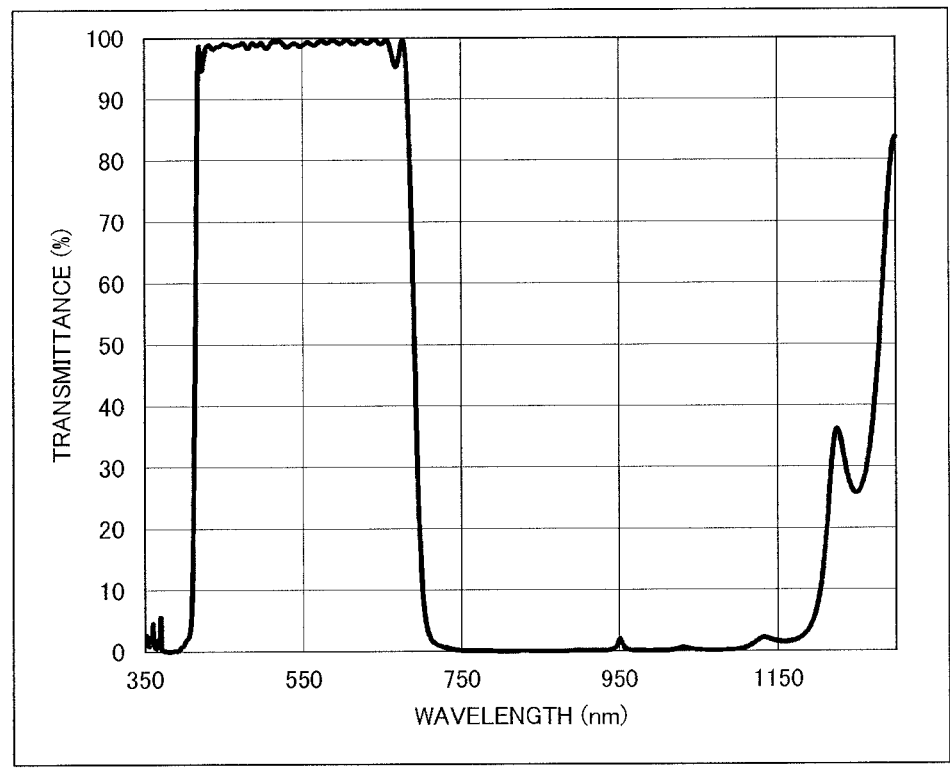
FIG. 14 is a graph of a transmittance distribution at a first thin film portion of Example 2.
Figure 15:
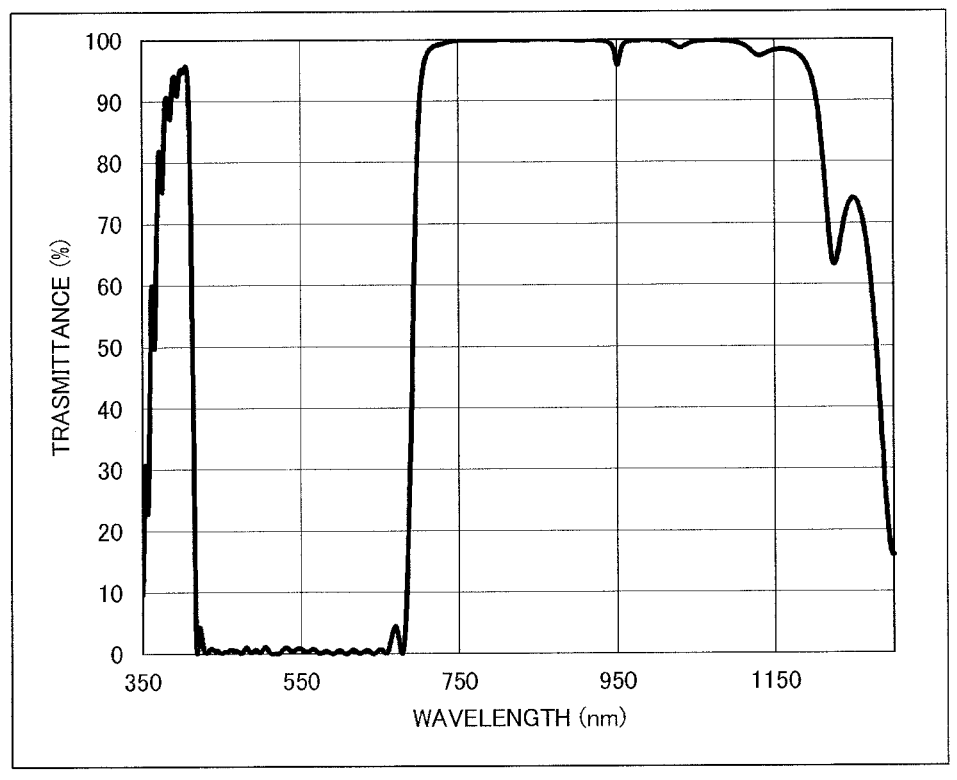
FIG. 15 is a graph of a reflectance distribution at the first thin film portion of Example 2.

FIG. 14 and FIG. 15 are graphs of a transmittance distribution and a reflectance distribution in the visible range, a near-infrared range (here, not shorter than 750 nm and not longer than 1200 nm), and adjacent ranges at the surface of the center portion 52C (center point thereof) on which the first thin film portion 60 (infrared ray cutting film) of Example 2 is formed.

According to these graphs, it is found that near-infrared light is cut mainly by reflection at the center portion 52C of Example 2.

The properties such as the transmittance of the surface of the peripheral portion 52R on which the second thin film portion 62 (light shielding film) of Example 2 is formed are the same as the properties such as the transmittance of the surface of the roughened surface portion 2R on which the second thin film portion 12 of Example 1 is formed (see FIG. 11 and FIG. 12).

Therefore, at the peripheral portion 52R of Example 2, a very low transmittance is realized in the visible range and the adjacent ranges. Due to such a peripheral portion 52R

TABLE 6

| | | Vapor deposition conditions | | | Assist ion source | | | |
|---|---|---|---|---|---|---|---|---|
| Film material | Target material | Acceleration voltage (kV) | Acceleration current (mA) | O$_2$ gas introduction amount (ccm) | Acceleration voltage (V) | Beam current (mA) | O$_2$ gas introduction amount (ccm) | Vapor deposition rate nm/sec |
| SiO$_2$ | Si granules | 7 | 180 | 50 | 900 | 900 | 50 | 1.0 |
| TiO$_2$ | Ti granules | 7 | 200 | 50 | 600 | 600 | 50 | 0.5 |

The manufacture by DC sputtering of Example 2 is performed in the same manner as Example 1 (see FIG. 3 and FIG. 4).

In the case where the first thin film portion 60 and the washing-time removal base film WB are formed by vapor deposition, a vapor deposition apparatus is used in FIGS. 3A and (B), and a sputtering apparatus is used in FIG. 3G.

with the second thin film portion 12, the infrared ray cutting member R of Example 2 sufficiently suppresses generation of stray light therein.

The manufacturing methods of Examples 1 and 2 are each a method for manufacturing the optical thin film 1 or 51 having the first thin film portion 10 or 60 and the second thin film portion 12 or 62 having a film configuration different from that of the first thin film portion 10 or 60, on the film formation surface F or F2 of the base member 2 or 52, and each include a step of forming the first thin film portion 10 or 60 on the first film formation portion of the film formation surface F or F2, a step of forming the washing-time removal film W, which has a fluff-like structure or the like and is at least one of aluminum and an aluminum compound, on the first thin film portion 10 or 60, a step of forming the second thin film portion 12 or 62 on the second film formation portion, of the film formation surface F or F2, different from the first film formation portion and on the first film formation portion on which the first thin film portion 10 or 60 and the washing-time removal film W have been formed, and a step of removing the washing-time removal film W and the second thin film portion 12 or 62 thereon by washing.

Therefore, an optical thin film in which the first thin film portion and the second thin film portion are separated is inexpensively manufactured with high quality without using any resist, the bridged mask MZ, and any organic solvent.

The term "on" the film formation surface, the first film formation portion, and the second film formation portion includes a state of being in contact with the film formation surface, the first film formation portion, and the second film formation portion, and a state of being not in contact with the film formation surface, the first film formation portion, and the second film formation portion and being away therefrom by an intermediate film but being present thereabove.

Also, in the manufacturing methods of Examples 1 and 2, the second thin film portions 12 and 62 have a ring shape and a frame shape, respectively. Therefore, a ring-shaped or frame-shaped thin film portion, which has been conventionally difficult to manufacture at a low cost with high quality, is manufactured at a low cost with high quality.

Furthermore, in each of the manufacturing methods of Examples 1 and 2, the washing-time removal film W is formed by immersing the washing-time removal base film WB, which is formed by physical vapor deposition using at least one of aluminum and an aluminum compound as a material, in hot water. Thus, the washing-time removal film W, which has a fluff-like structure or the like and is required for forming the second thin film portion 12 or 62 separated from the first thin film portion 10 or 60, is easily formed.

Also, in each of the manufacturing methods of Examples 1 and 2, the washing-time removal film W and the second thin film portion 12 or 62 thereon are washed by at least one of running water and ultrasonic waves. Therefore, the washing step can be easily performed.

Furthermore, in the manufacturing methods of Examples 1 and 2, the second thin film portions 12 and 62 are light shielding films that cut visible light. Therefore, a ring-shaped or frame-shaped light shielding film for prevention of stray light in the lens unit and the like is formed at a low cost with high quality.

Furthermore, in the manufacturing methods of Examples 1 and 2, the first thin film portions 10 and 60 are AR films that suppress reflection of visible light. Therefore, the first thin film portions 10 and 60 are provided with a function to suppress reflection of visible light.

In addition, the optical thin films 1 and 51 of Examples 1 and 2 have the first thin film portions 10 and 60 and the second thin film portions 12 and 62 having film configurations different from those of the first thin film portions 10 and 60, and the second thin film portions 12 and 62 surround the first thin film portions 10 and 60, and no resist remains at the first thin film portions 10 and 60.

Therefore, in the optical thin films 1 and 51 of Examples 1 and 2, no resist remains as in Patent Literature 1 described above, and no thinned portions 12ZT are formed as in the comparative example described above, so that the optical thin films 1 and 51 in which the first thin film portions 10 and 60 and the second thin film portions 12 and 62 are simply separated in a high quality state are provided.

Also, in the optical thin films 1 and 51 of Examples 1 and 2, the second thin film portions 12 and 62 are light shielding films that cut visible light. Therefore, the optical thin films 1 and 51 each having a ring-shaped or frame-shaped light shielding film for prevention of stray light in the lens unit and the like have high quality.

Furthermore, in the optical thin films 1 and 51 of Examples 1 and 2, the first thin film portions 10 and 60 are AR films that suppress reflection of visible light. Therefore, at the first thin film portions 10 and 60 surrounded by the second thin film portions 12 and 62, reflection of visible light is suppressed.

In addition, in the step of forming the first thin film portion 10 or 60 of Example 1 or 2 (FIGS. 3A and 3B and FIGS. 4A to 4D), the first thin film portion 10 or 60 is formed only on the first film formation portion (surface of the lens portion 2L) by the mask M. Therefore, the first thin film portion 10 or 60 is easily formed in a desired shape corresponding to the shape of the mask M.

Example 3 corresponds to the third embodiment (light shielding AR lens member

L) described above.

In Example 3, the configuration of the first thin film portion 10 (AR film) and the second thin film portion 12 (light shielding film) are both the same as in Example 1 described above.

Next, a manufacturing method of Example 3 will be described.

The manufacturing method, including a manufacturing apparatus, for the optical thin film 1 according to the present invention is not limited to the following embodiment.

The manufacturing method of Example 3 is the same as that of Example 1, except for the first half thereof. FIG. 16 is a schematic diagram illustrating the first half of the manufacturing method of Example 3.

Figures 16A, 16B, 16C, 16D:
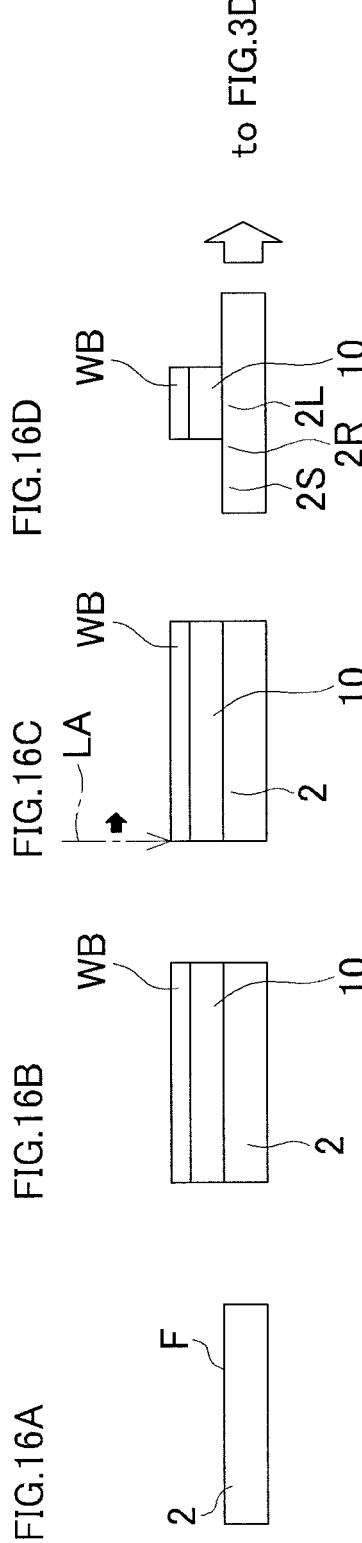
FIGS. 16A to D are schematic diagrams illustrating the first half of a manufacturing method of Example 3 corresponding to a third embodiment of the present invention, mainly from a side surface side of a light shielding AR lens member.

As shown in FIG. 16A, the base member 2 before film formation is placed in a vacuumed film formation chamber of a sputtering film formation apparatus in a horizontal state where the film formation surface F (back surface) faces upward. In the manufacturing method of Example 3, unlike the manufacturing method of Example 1, the mask M is not used.

Next, as shown in FIG. 16B, the first thin film portion 10 and then the washing-time removal base film WB are formed in the same manner as Example 1, except that the mask M is not present.

The first thin film portion 10 and the washing-time removal base film WB are formed on the film formation surface F of the base member 2.

Subsequently, as shown in FIG. 16C, the base member 2 with the first thin film portion 10 and the washing-time removal base film WB is taken out from the sputtering film formation apparatus once, and the first thin film portion 10 and the washing-time removal base film WB on the roughened surface portion 2R and on the peripheral flat portion 2S are irradiated with a laser beam LA.

By the irradiation with the laser beam LA, the first thin film portion 10 and the washing-time removal base film WB on the roughened surface portion 2R and on the peripheral flat portion 2S are removed. The first thin film portion 10 and the washing-time removal base film WB are placed only on the lens portion 2L.

The output of the laser beam LA is set to a magnitude that allows the first thin film portion 10 and the washing-time removal base film WB to be removed and that does not cause effects on the roughened surface portion 2R and the peripheral flat portion 2S such as shape change exceeding a predetermined degree. The output of the laser beam LA can be adjusted in various ways. For example, in the case where at least one of the first thin film portion 10 and the washing-time removal base film WB is permitted to remain in a predetermined amount or smaller, the output of the laser beam LA may be set lower than the output at which the first thin film portion 10 and the washing-time removal base film WB are completely removed. Also, as in the case where the light shielding film is formed on the roughened surface portion 2R and on the peripheral flat portion 2S, when shape change to a predetermined degree or lower, such as generation of minute scratches, is permitted since the shape change does not impair the light shielding function, or depending on the case, enhances the light shielding function, the output of the laser beam LA may be set higher than the minimum output at which the first thin film portion 10 and the washing-time removal base film WB are removed. If the output of the laser beam LA is set higher than the minimum output as described above, the first thin film portion 10 and the washing-time removal base film WB are more reliably removed.

The laser beam LA traces over the roughened surface portion 2R and the peripheral flat portion 2S according to the spot diameter thereof. For example, the laser beam LA is applied while scanning the roughened surface portion 2R and the peripheral flat portion 2S with a scanning width equal to or slightly smaller than the spot diameter (diameter). By such irradiation with the laser beam LA, the removed portions of the first thin film portion 10 and the washing-time removal base film WB are patterned, and as a result, the remaining portions of the first thin film portion 10 and the washing-time removal base film WB are patterned (FIG. 16D).

Then, the base member 2 having the patterned first thin film portion 10 and the washing-time removal base film WB is formed so as to be the same as in FIG. 3C of Example 1, and is subjected to the same treatment as in FIG. 3D and thereafter.

In order to examine the characteristics of Example 3 in a more diverse and simplified manner, a sample obtained by forming an optical thin film on a parallel flat plate base member 2 by the same manufacturing method as in Example 3 was made. The base member 2 of the sample was made of polycarbonate, and its size is 50 mm in length, 50 mm in width, and 1.0 mm in thickness. Also, the manufacturing method of Example 3 has the same modifications as the manufacturing method of Example 1 as appropriate.

FIG. 17 is a photograph of the sample. The black portions are the second thin film portion 12 (light shielding film) and the base member 2 located below the second thin film portion 12, and the other portions are the first thin film portion 10 (AR film) and the base member 2 located below the first thin film portion 10. As shown in FIG. 17, the optical thin film 1 patterned into various shapes, such as a black circle, a black cross, a white cross, a black thick cross, a white thick cross, a black small ring, and a black large ring, is formed.

The manufacturing method for the optical thin film 1 according to the present invention is not limited to the form of the manufacture of the sample. Also, the manufacturing method for the sample has the same modifications as each of the other manufacturing methods described above, as appropriate.

The manufacture of the sample is further described.

The first thin film portion 10 (AR film) is deposited on the entirety of one surface of the parallel flat plate base member 2 under the conditions of Table 6 above for Example 2 (corresponding to FIGS. 16A and 16B). The first thin film portion 10 (AR film) has seven layers in total, and is a film in which $SiO_2$ layers (odd number layers) and $TiO_2$ layers (even number layers) are alternated. The film configuration of the first thin film portion 10 (AR film) is shown in Table 7 below

TABLE 7

| Layer | Material | Film thickness (nm) |
|---|---|---|
| First layer | $SiO_2$ | 153.5 |
| Second layer | $TiO_2$ | 14.0 |
| Third layer | $SiO_2$ | 27.0 |
| Fourth layer | $TiO_2$ | 62.0 |
| Fifth layer | $SiO_2$ | 10.5 |
| Sixth layer | $TiO_2$ | 37.0 |
| Seventh layer | $SiO_2$ | 96.0 |

Furthermore, an Al layer is formed as the washing-time removal base film WB on the entirety of one surface of the base member 2 with the first thin film portion 10 (AR film) by DC sputtering under the conditions in the fourth row of Table 4 (corresponding to FIG. 16B).

Then, patterning is performed by irradiation with the laser beam LA (corresponding to FIGS. 16C and 16D). Here, the laser beam LA was emitted by MD-X1520 manufactured by KEYENCE CORPORATION in a state where the wavelength of the laser beam LA was 1.06 μm, the frequency thereof was 40 kHz, the spot diameter (diameter) thereof was 80 μm, and the scanning speed thereof was 2000 mm/sec. The laser beam LA is a YAG laser beam. Scanning is performed mainly by driving a galvanometer mirror.

Patterning is performed by scanning a shape corresponding to the second thin film portion 12 (light shielding film, black portions) by the laser beam.

At least any of the type and various settings of the laser beam LA and the shape of patterning may be changed from those described above. In particular, the magnitude of the output of the laser beam LA may be any magnitude that allows the first thin film portion 10 (AR film) and the washing-time removal base film WB to be removed such that the first thin film portion 10 (AR film) and the washing-time removal base film WB are permitted to remain in a predetermined amount as appropriate. In the case where the first thin film portion 10 (AR film) and the second thin film portion 12 (light shielding film) are permitted to overlap each other, the magnitude of the output of the laser beam LA may be any magnitude that allows the washing-time removal base film WB to be removed. In addition, in the case where the first thin film portion 10 (AR film) and the second thin film portion 12 (light shielding film) are permitted to overlap each other, and further, the washing-time removal film W is permitted to remain in a specific amount or smaller, the magnitude of the output of the laser beam LA may be any magnitude that allows the washing-time removal base film WB to be removed (partially removed) such that the washing-time removal base film WB remains in the specific amount or smaller.

Then, as shown in FIGS. 3D to 3F, the washing-time removal base film WB is made into the washing-time removal film W having a fluff-like structure or the like, by immersion in the hot water HW.

Also, as shown in FIG. 3G, the second thin film portion 12 (light shielding film) is formed on the entirety of one surface of the base member 2 with the first thin film portion 10 (AR film) and the washing-time removal film W. Here, the film configuration of the second thin film portion 12 (light shielding film) is the same as that shown in Table 2 above for Example 1.

Then, by immersion in the hot water HW and washing with running water as shown in FIGS. 3H to 3J, the sample having the first thin film portion 10 (AR film) and the second thin film portion 12 (light shielding film) is formed as shown in FIG. 3K.

Figure 18:
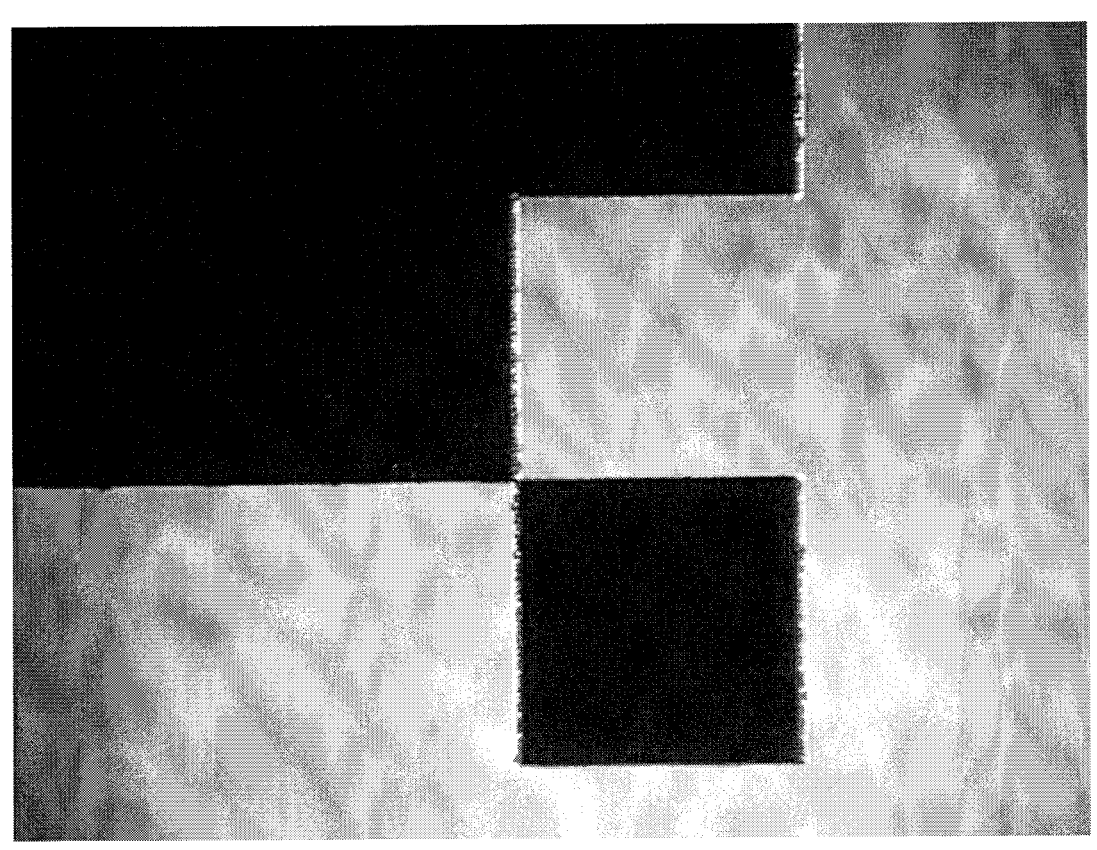
FIG. 18 is an enlarged view of a lower right portion of a black thick cross and an upper right portion of a white thick cross in FIG. 17.

FIG. 18 is an enlarged view of a lower right portion of the black thick cross and an upper right portion of the white thick cross in FIG. 17. FIG. 19 is an enlarged view of a small black ring-shaped portion in FIG. 17. FIG. 20 is an enlarged view (bright field microscope image) of a ring lower inner peripheral portion in FIG. 19, the upper part of FIG. 20 is the first thin film portion 10 (AR film), and the lower part of FIG. 20 is the second thin film portion 12 (light shielding film).

These figures show that patterning is performed with a certain degree of quality or higher. In addition, the quality of the patterning can be further improved by reducing at least one of the spot diameter and the scanning speed of the laser beam LA and the like.

FIG. 21 is a graph of each of reflectance distributions in the visible range and adjacent ranges at the first thin film portion 10 (AR film) and the second thin film portion 12 (light shielding film) of the sample.

According to this graph, it is found that low reflection of visible light is realized at the first thin film portion 10 (AR film) which is transparent in the visible range. In addition, it is found that the second thin film portion 12 (light shielding film) which has a light shielding function by light absorption also has an anti-reflection function in the visible range and the adjacent ranges.

The manufacturing method of Example 3 (sample) is a method for manufacturing the optical thin film 1 having the first thin film portion 10 and the second thin film portion 12 having a film configuration different from that of the first thin film portion 10, on the film formation surface F of the base member 2, and includes a step of forming the first thin film portion 10 on the first film formation portion of the film formation surface F, a step of forming the washing-time removal film W, which has a fluff-like structure or the like and is at least one of aluminum and an aluminum compound, on the first thin film portion 10, a step of forming the second thin film portion 12 on the second film formation portion, of the film formation surface F, different from the first film formation portion and on the first film formation portion on which the first thin film portion 10 and the washing-time removal film W have been formed, and a step of removing the washing-time removal film W and the second thin film portion 12 thereon by washing.

Therefore, an optical thin film in which the first thin film portion and the second thin film portion are separated is inexpensively manufactured with high quality without using any resist, the bridged mask MZ, and any organic solvent.

The term "on" the film formation surface, the first film formation portion, and the second film formation portion includes a state of being in contact with the film formation surface, the first film formation portion, and the second film formation portion, and a state of being not in contact with the film formation surface, the first film formation portion, and the second film formation portion and being away therefrom by an intermediate film but being present thereabove.

In addition, in the step of forming the first thin film portion 10 in Example 3 (sample), after the first thin film portion 10 is formed on the entirety of the film formation surface F whose part is the first film formation portion (FIGS. 16A and 16B), the first thin film portion 10 on the portion (second film formation portion) of the film formation surface F other than the first film formation portion is removed by the laser beam LA (FIGS. 16C and 16D).

Therefore, the first thin film portion 10 (second thin film portion 12) can be patterned in any shape. Also, in the case where damage to the second film formation portion and the like due to the removal by the laser beam LA, for example, cloudiness, surface roughness, surface melting, remaining of at least one of the first thin film portion 10 and the washing-time removal base film WB, is permitted as in the case where the second thin film portion 12 is a light shielding film, it is easier to set the laser beam LA for removal, so that the optical thin film 1 can be manufactured more efficiently.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. An optical thin film manufacturing method for manufacturing an optical thin film having a first thin film portion and a second thin film portion whose film configuration is different from that of the first thin film portion, on a film formation surface of a base member directly or via an intermediate film, the method comprising:
　　forming the first thin film portion on a first film formation portion of the film formation surface;
　　forming a washing-time removal film on the first thin film portion, the washing-time removal film having at least one of a fluff-like structure, a pyramid group-like structure and a pinholder-like structure, and being at least one of aluminum and an aluminum compound;
　　forming the second thin film portion on a second film formation portion, that is different from the first film formation portion of the film formation surface, and on the first film formation portion on which the first thin film portion and the washing-time removal film have been formed; and
　　removing the washing-time removal film and the second thin film portion thereon by washing.

2. The optical thin film manufacturing method according to claim 1, wherein the second thin film portion has a ring shape or a frame shape.

3. The optical thin film manufacturing method according to claim 1, wherein the washing-time removal film is formed by immersing a washing-time removal base film in hot water, the washing-time removal base film being formed by physical vapor deposition using at least one of aluminum and an aluminum compound as a material.

4. The optical thin film manufacturing method according to claim 1, wherein the washing-time removal film and the second thin film portion thereon are washed by at least one of running water and ultrasonic waves.

5. The optical thin film manufacturing method according to claim 1, wherein the second thin film portion is a light shielding film that cuts visible light.

6. The optical thin film manufacturing method according to claim 1, wherein the first thin film portion is an anti-reflection film that suppresses reflection of visible light.

7. The optical thin film manufacturing method according to claim 1, wherein, in forming the first thin film portion, the first thin film portion is formed only on the first film formation portion by a mask.

8. The optical thin film manufacturing method according to claim 1, wherein, in forming the first thin film portion, the first thin film portion is formed on an entirety or a part of the intermediate film or the film formation surface whose part is the first film formation portion, and then the first thin film portion on the part of the intermediate film or the film formation surface other than the first film formation portion is removed by a laser beam.

\* \* \* \* \*